(12) United States Patent
Zhang et al.

(10) Patent No.: US 12,739,249 B2
(45) Date of Patent: Sep. 15, 2026

(54) METHOD AND APPARATUS FOR AUTHENTICATION AND AUTHORIZATION

(71) Applicant: Telefonaktiebolaget LM Ericsson (PUBL), Stockholm (SE)

(72) Inventors: Wen Zhang, Shanghai (CN); Gang Ren, Shanghai (CN); Juying Gan, Shanghai (CN); Wenliang Xu, Shanghai (CN); Yunjie Lu, Shanghai (CN)

(73) Assignee: Telefonaktiebolaget LM Ericsson (PUBL), Stockholm (SE)

( * ) Notice: Subject to any disclaimer, the term of this patent is extended or adjusted under 35 U.S.C. 154(b) by 209 days.

(21) Appl. No.: 17/999,953

(22) PCT Filed: Jun. 2, 2021

(86) PCT No.: PCT/CN2021/097966
§ 371 (c)(1),
(2) Date: Nov. 28, 2022

(87) PCT Pub. No.: WO2021/244578
PCT Pub. Date: Dec. 9, 2021

(65) Prior Publication Data
US 2023/0224300 A1 Jul. 13, 2023

(30) Foreign Application Priority Data
Jun. 3, 2020 (WO) ................ PCT/CN2020/094214

(51) Int. Cl.
*H04L 9/40* (2022.01)
*H04W 12/06* (2021.01)

(52) U.S. Cl.
CPC ......... *H04L 63/0892* (2013.01); *H04W 12/06* (2013.01)

(58) Field of Classification Search
CPC ........................... H04L 63/0892; H04W 12/06
See application file for complete search history.

(56) References Cited

U.S. PATENT DOCUMENTS

2019/0069210 A1* 2/2019 Lee ....................... H04W 76/30
2019/0104447 A1* 4/2019 Horn .................. H04W 12/104
(Continued)

FOREIGN PATENT DOCUMENTS

CN 110602024 A 12/2019

OTHER PUBLICATIONS

Han, Kaihong; Ma, Maode; Li, Xiaohong; Feng, Zhiyong; Hao, Jianye; "An Efficient Handover Authentication Mechanism for 5G Wireless Network," IEEE Wireless Communications and Networking Conference (WCNC), Marrakesh, Morocco, Apr. 15-18, 2019, pp. 1-8.*
3GPP TS 23.501 v16.4.0; Technical Specification; 3rd Generation Partnership Project; Technical Specification Group Services and System Aspects; System architecture for the 5G System (5GS); Stage 2 (Release 16)—Mar. 2020.
(Continued)

*Primary Examiner* — Victor Lesniewski
(74) *Attorney, Agent, or Firm* — Baker Botts L.L.P.

(57) ABSTRACT

Embodiments of the present disclosure provide methods and apparatus for authentication and authorization. A method at a session management function entity comprises determining whether to initiate a secondary authentication and/or authorization of a session of a terminal device after the terminal device moves from a first network to a second network or from the second network to the first network. The method further comprises, in response to a positive determination, send a first message to an authentication, authorization, and accounting, AAA, server to initiate the secondary authentication and/or authorization of the session of the terminal device.

20 Claims, 13 Drawing Sheets

(56) References Cited

U.S. PATENT DOCUMENTS

| | | | | |
|---|---|---|---|---|
| 2019/0261260 | A1* | 8/2019 | Dao | H04W 8/20 |
| 2019/0379530 | A1* | 12/2019 | Suthar | H04M 15/66 |
| 2020/0053165 | A1* | 2/2020 | Li | H04W 12/08 |
| 2020/0153830 | A1* | 5/2020 | Li | H04L 9/3242 |
| 2020/0162919 | A1 | 5/2020 | Velev et al. | |
| 2020/0228936 | A1* | 7/2020 | Talebi Fard | H04W 4/08 |
| 2020/0260506 | A1* | 8/2020 | Benson | H04W 72/04 |
| 2020/0260525 | A1* | 8/2020 | Gan | H04W 76/11 |
| 2020/0267223 | A1* | 8/2020 | Baek | H04L 67/53 |
| 2020/0351980 | A1* | 11/2020 | Talebi Fard | H04W 76/40 |
| 2021/0076209 | A1* | 3/2021 | Suh | H04W 8/08 |
| 2021/0297457 | A1* | 9/2021 | Schneider | H04W 12/02 |
| 2022/0201488 | A1* | 6/2022 | Liu | H04W 12/03 |
| 2022/0256448 | A1* | 8/2022 | Tamura | H04W 48/18 |
| 2023/0087407 | A1* | 3/2023 | Wu | H04W 12/065<br>726/4 |
| 2023/0109272 | A1* | 4/2023 | Ryu | H04L 63/0892<br>370/329 |

OTHER PUBLICATIONS

3GPP TS 23.502 v16.4.0; Technical Specification; 3rd Generation Partnership Project; Technical Specification Group Services and System Aspects; Procedures for the 5G System (5GS); Stage 2 (Release 16)—Mar. 2020.

3GPP TS 29.561 v16.3.0; Technical Specification; 3rd Generation Partnership Project; Technical Specification Group Core Network and Terminals; 5G System; Interworking between 5G Network and external Data Networks; Stage 3 (Release 16)—Mar. 2020.

PCT Notification of Transmittal of the International Search Report and the Written Opinion of the International Searching Authority, or the Declaration issued for International application No. PCT/CN2021/097966—Aug. 30, 2021.

Intellectual Property India, Official Action in IN Application No. 202217072237, dated Jul. 16, 2026.

"3rd Generation Partnership Project; Technical Specification Group Services and System Aspects; Procedures for the 5G System (5GS)"; Stage 2 (Release 16), 3GPP TS 23.502 v16.3.0 (Dec. 2019).

* cited by examiner

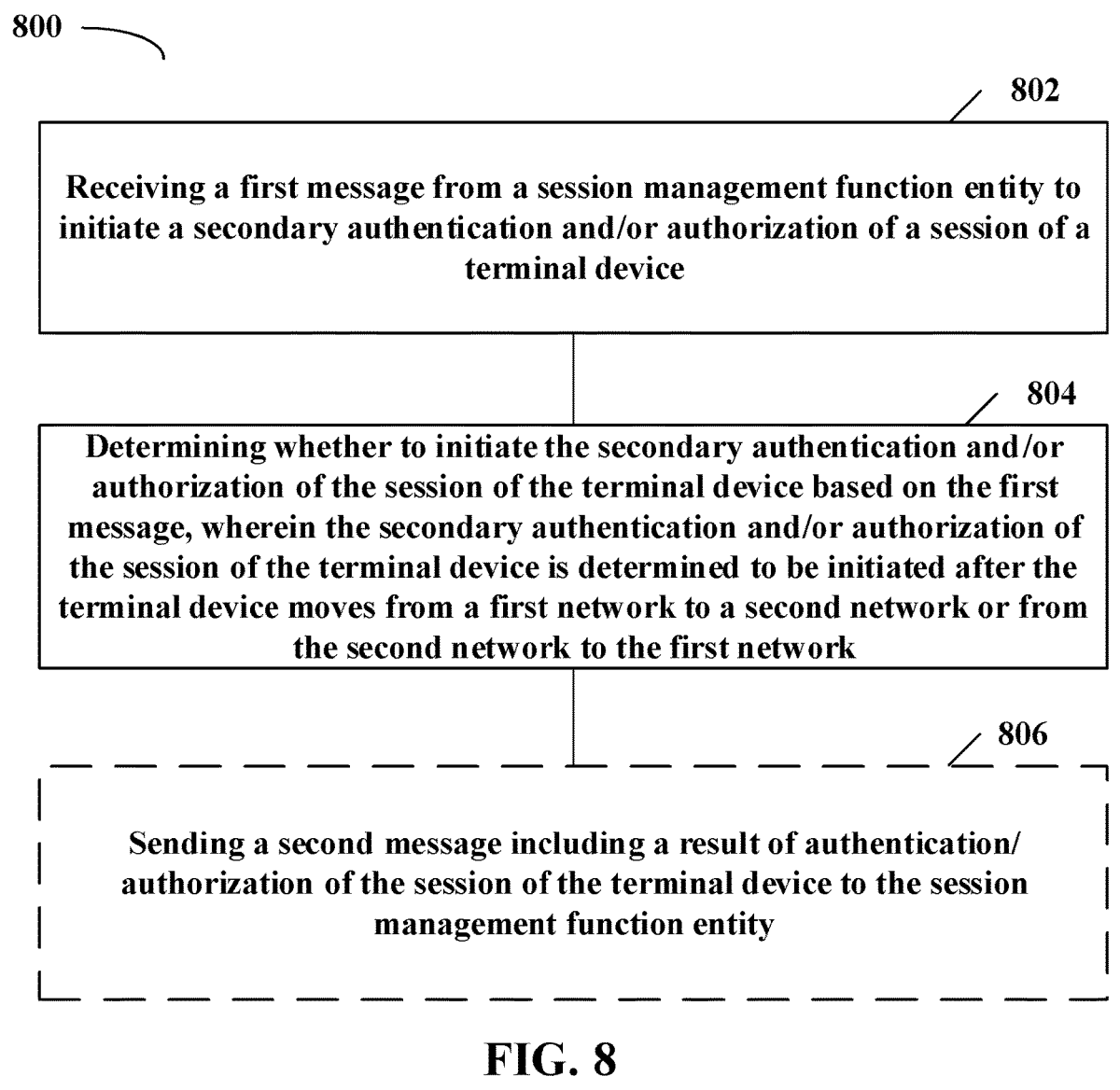

800

802

Receiving a first message from a session management function entity to initiate a secondary authentication and/or authorization of a session of a terminal device

804

Determining whether to initiate the secondary authentication and/or authorization of the session of the terminal device based on the first message, wherein the secondary authentication and/or authorization of the session of the terminal device is determined to be initiated after the terminal device moves from a first network to a second network or from the second network to the first network

806

Sending a second message including a result of authentication/ authorization of the session of the terminal device to the session management function entity

FIG. 8

METHOD AND APPARATUS FOR AUTHENTICATION AND AUTHORIZATION

PRIORITY

This nonprovisional application is a U.S. National Stage Filing under 35 U.S.C. § 371 of International Patent Application Serial No. PCT/CN2021/097966 filed Jun. 2, 2021 and entitled "Method and Apparatus for Authentication and Authorization" which claims priority to International Patent Application Serial No PCT/CN2020/094214 filed Jun. 3, 2020 both of which are hereby incorporated by reference in their entirety.

TECHNICAL FIELD

The non-limiting and exemplary embodiments of the present disclosure generally relate to the technical field of communications, and specifically to methods and apparatuses for authentication and authorization.

BACKGROUND

This section introduces aspects that may facilitate a better understanding of the disclosure. Accordingly, the statements of this section are to be read in this light and are not to be understood as admissions about what is in the prior art or what is not in the prior art.

According to 3GPP TS 23.401 V16.6.0, the disclosure of which is incorporated by reference herein in its entirety, Protocol Configuration Options (PCO) are used to transfer parameters between the UE (user equipment) and the PDN GW (packet data network (PDN) gateway (GW)), and sent transparently through the MME (Mobile Management Entity) and the Serving GW. The Protocol Configuration Options may include the Address Allocation Preference indicating that the UE prefers to obtain an IPv4 (Internet protocol version 4) address only after the default bearer activation by means of DHCPv4 (Dynamic Host Configuration Protocol version 4). If the UE intends to send PCO which require ciphering (e.g., PAP (Password Authentication Protocol)/CHAP (Challenge Handshake Authentication Protocol) usernames and passwords) or send an APN (Access Point Name), or both, the UE shall set the Ciphered Options Transfer Flag and send PCO or APN or both only after authentication and NAS (Non-Access Stratum) security setup have been completed.

According to 3GPP TS 23.501 V16.4.0, the disclosure of which is incorporated by reference herein in its entirety, secondary authentication/authorization by a DN-AAA (data network (DN) authentication, authorization, and accounting (AAA)) server is only defined during PDU (protocol data unit) Session Establishment. If the UE provides authentication/authorization information corresponding to a DN-specific identity during the Establishment of the PDU Session, and the SMF determines that authentication/authorization of the PDU Session Establishment is required based on the SMF policy associated with the DN. EAP (Extensible Authentication Protocol) authentication may be mandatory for 5GC (fifth generation core network) because it is higher security than legacy PAP/CHAP (user-name and user password). Currently EAP is used for 5G user authentication, legacy PAP/CHAP is required to be used in a secured EAP tunnel by EAP-TTLS (Extensible Authentication Protocol Tunneled Transport Layer Security Authenticated Protocol).

The legacy PAP/CHAP (user-name and user-password come from PCO) is still used for 4G (fourth generation) PDN connection setup (include the 4G user which has the 5G capability. EAP based authentication is not defined for 4G PDN connection.

Some special authentication and authorization attributes (such as 3GPP-Notification, 3GPP-Authorization-Reference, 3GPP-Policy-Reference, 3GPP-Session-AMBR-v2, 3GPP-NAI) for 5G PDU are defined in 3GPP TS 29.561 V16.3.0, the disclosure of which is incorporated by reference herein in its entirety. 3GPP TS 29.561 V16.3.0 defines the EAP-based secondary authentication and authorization for 5G PDU Session. 3GPP TS 29.061 V15.5.0, the disclosure of which is incorporated by reference herein in its entirety, defines the authentication and authorization for 4G PDN connection.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

An object of the embodiments of the present disclosure is to propose an improved authentication and authorization solution.

In a first aspect of the disclosure, there is provided a method at a session management function entity. The method comprises determining whether to initiate a secondary authentication and/or authorization of a session of a terminal device after the terminal device moves from a first network to a second network or from the second network to the first network. The method further comprises, in response to a positive determination, send a first message to an authentication, authorization, and accounting (AAA) server to initiate the secondary authentication and/or authorization of the session of the terminal device.

In an embodiment, determining whether to initiate the secondary authentication and/or authorization of the session of the terminal device after the terminal device moves from the first network to the second network may be based on at least one of subscription data of the terminal device or a local policy of the session management function entity or an indication that the secondary authentication and/or authorization of the session of the terminal device is pending.

In an embodiment, determining to initiate the secondary authentication and/or authorization of the session of the terminal device after the terminal device moves from the first network to the second network or from the second network to the first network.

In an embodiment, the indication that the secondary authentication and/or authorization of the session of the terminal device is pending may be a flag.

In an embodiment, the method may further comprise receiving a second message including a result of authentication/authorization of the session of the terminal device from the AAA server. The method further comprise, when the result indicates successful, maintain the session of the terminal device. The method may further comprise, when the result indicates unsuccessful, initiate a session release procedure for releasing the session of the terminal device.

In an embodiment, the first message may be a Remote Authentication Dial In User Service, RADIUS, Access-Request or a Diameter-EAP-Request, DER.

In an embodiment, the second message may be a RADIUS Access-Accept or a RADIUS Access-reject or a Diameter-EAP-Answer, DEA.

In an embodiment, the method may further comprise receiving a third message related to the secondary authentication and/or authorization of the session of the terminal device from the AAA server. The method may further comprise sending a fourth message to the AAA server. The fourth message may include information for indicating that the terminal device has moved to the first network and/or an indication that the secondary authentication and/or authorization of the session of the terminal device is pending.

In an embodiment, the method may further comprise setting a flag used to indicate the secondary authentication and/or authorization of the session of the terminal device cannot be performed.

In an embodiment, the third message may be a Remote Authentication Dial In User Service, RADIUS, Change-of-Authorization, CoA, request or a Diameter Re-Auth-Request, RAR.

In an embodiment, the fourth message may be a RADIUS CoA response or a Diameter Re-Auth-Answer, RAA.

In an embodiment, at least one authentication method of the secondary authentication may use an Extensible Authentication Protocol, EAP.

In an embodiment, the AAA server may be a data network AAA, DN-AAA, server.

In an embodiment, the DN-AAA server may be a Remote Authentication Dial In User Service, RADIUS, Authentication server or a Diameter Authentication server.

In an embodiment, the session of the terminal device may be a protocol data unit, PDU, session.

In an embodiment, the first network may be an evolved packet system, EPS, and the second network is a fifth generation system, 5GS.

In an embodiment, the first message may comprise a report of a change between the first network and the second network.

In an embodiment, the change between the first network and the second network comprises a change of core network type or change of Radio Access Technology, RAT, type.

In a second aspect of the disclosure, there is provided a method at an authentication, authorization, and accounting, AAA, server. The method comprises receiving a first message from a session management function entity to initiate a secondary authentication and/or authorization of a session of a terminal device. The method further comprises determining whether to initiate the secondary authentication and/or authorization of the session of the terminal device based on the first message. The secondary authentication and/or authorization of the session of the terminal device is determined to be initiated after the terminal device moves from a first network to a second network or from the second network to the first network.

In an embodiment, the secondary authentication and/or authorization of the session of the terminal device may be determined to be initiated after the terminal device moves from the first network to the second network based on at least one of subscription data of the terminal device or a local policy of the session management function entity or an indication that the secondary authentication and/or authorization of the session of the terminal device is pending.

In an embodiment, the secondary authentication and/or authorization of the session of the terminal device may be determined to be initiated after the terminal device moves from the first network to the second network or from the second network to the first network.

In an embodiment, the method may further comprise sending a second message including a result of authentication/authorization of the session of the terminal device to the session management function entity.

In an embodiment, the method may further comprise sending a third message related to the secondary authentication and/or authorization of the session of the terminal device to the session management function entity. The method may further comprise receiving a fourth message from the session management function entity. The fourth message may include information for indicating that the terminal device has moved to the first network and/or an indication that the secondary authentication and/or authorization of the session of the terminal device is pending. The method may further comprise deciding to maintain the session of the terminal device or initiate a session release procedure for releasing the session of the terminal device based on the fourth message.

In a third aspect of the disclosure, there is provided a method at a session management function entity. The method comprises receiving a third message related to a secondary authentication and/or authorization of a session of a terminal device from an authentication, authorization, and accounting, AAA, server. The method further comprises sending a fourth message to the AAA server. The fourth message includes information for indicating that the terminal device has moved to the first network and/or an indication that the secondary authentication and/or authorization of the session of the terminal device is pending.

In an embodiment, the method may further comprise setting a flag used to indicate a secondary authentication and/or authorization of the session of the terminal device cannot be performed.

In an embodiment, the method may further comprise determining whether to initiate the secondary authentication and/or authorization of the session of the terminal device after the terminal device moves from the first network to a second network or from the second network to the first network. The method may further comprise, in response to a positive determination, sending a first message to the AAA server to initiate the secondary authentication and/or authorization of the session of the terminal device.

In a fourth aspect of the disclosure, there is provided a method at an authentication, authorization, and accounting, AAA, server. The method comprises sending a third message related to a secondary authentication and/or authorization of a session of a terminal device to the session management function entity. The method further comprises receiving a fourth message from the session management function entity. The fourth message includes information for indicating that the terminal device has moved to the first network and/or an indication that the secondary authentication and/or authorization of the session of the terminal device is pending. The method further comprises deciding to maintain the session or initiate a session release procedure for releasing the session of the terminal device based on the fourth message.

In an embodiment, the method may further comprise receiving a first message from the session management function entity to initiate the secondary authentication and/or authorization of the session of the terminal device. The method may further comprise initiating the secondary authentication and/or authorization of the session based on the first message. The secondary authentication and/or authorization of the session of the terminal device is determined to be initiated after the terminal device moves from the first network to a second network or from the second network to the first network.

In an embodiment, the method may further comprise sending a second message including a result of authentication/authorization of the session of the terminal device to the session management function entity.

In a fifth aspect of the disclosure, there is provided a session management function entity. The session management function entity comprises a processor and a memory coupled to the processor. Said memory contains instructions executable by said processor. Said session management function entity is operative to determine whether to initiate a secondary authentication and/or authorization of a session of a terminal device after the terminal device moves from a first network to a second network or from the second network to the first network. Said session management function entity is further operative to, in response to a positive determination, send a first message to an authentication, authorization, and accounting, AAA, server to initiate the secondary authentication and/or authorization of the session of the terminal device.

In a sixth aspect of the disclosure, there is provided an authentication, authorization, and accounting, AAA, server. The AAA server comprises a processor and a memory coupled to the processor. Said memory contains instructions executable by said processor. Said AAA server is operative to receive a first message from a session management function entity to initiate a secondary authentication and/or authorization of a session of a terminal device. Said AAA server is further operative to determine whether to initiate the secondary authentication and/or authorization of the session of the terminal device based on the first message. The secondary authentication and/or authorization of the session of the terminal device is determined to be initiated after the terminal device moves from a first network to a second network or from the second network to the first network.

In a seventh aspect of the disclosure, there is provided a session management function entity. The session management function entity comprises a processor and a memory coupled to the processor. Said memory contains instructions executable by said processor. Said session management function entity is operative to receive a third message related to a secondary authentication and/or authorization of a session of a terminal device from an authentication, authorization, and accounting, AAA, server. Said session management function entity is further operative to send a fourth message to the AAA server. The fourth message includes information for indicating that the terminal device has moved to the first network and/or an indication that the secondary authentication and/or authorization of the session of the terminal device is pending.

In an eighth aspect of the disclosure, there is provided an authentication, authorization, and accounting, AAA, server. The AAA server comprises a processor and memory coupled to the processor. Said memory contains instructions executable by said processor. Said AAA server is operative to send a third message related to a secondary authentication and/or authorization of a session of a terminal device to the session management function entity. Said AAA server is further operative to receive a fourth message from the session management function entity. The fourth message includes information for indicating that the terminal device has moved to the first network and/or an indication that the secondary authentication and/or authorization of the session of the terminal device is pending. Said AAA server is further operative to decide to maintain the session or initiate a session release procedure for releasing the session of the terminal device based on the fourth message.

In another aspect of the disclosure, there is provided a session management function entity. The session management function entity comprises a determining module and a sending module. The determining module may be configured to determine whether to initiate a secondary authentication and/or authorization of a session of a terminal device after the terminal device moves from a first network to a second network or from the second network to the first network. The sending module may be configured to, in response to a positive determination, send a first message to an authentication, authorization, and accounting, AAA, server to initiate the secondary authentication and/or authorization of the session of the terminal device.

In another aspect of the disclosure, there is provided an AAA server. The AAA server comprises a receiving module and a determining module. The receiving module may be configured to receive a first message from a session management function entity to initiate a secondary authentication and/or authorization of a session of a terminal device. The determining module may be configured to determine whether to initiate the secondary authentication and/or authorization of the session of the terminal device based on the first message. The secondary authentication and/or authorization of the session of the terminal device is determined to be initiated after the terminal device moves from a first network to a second network or from the second network to the first network.

In another aspect of the disclosure, there is provided a session management function entity. The session management function entity comprises a receiving module and a sending module. The receiving module may be configured to receiving a third message related to a secondary authentication and/or authorization of a session of a terminal device from an authentication, authorization, and accounting, AAA, server. The sending module may be configured to send a fourth message to the AAA server. The fourth message includes information for indicating that the terminal device has moved to the first network and/or an indication that the secondary authentication and/or authorization of the session of the terminal device is pending.

In another aspect of the disclosure, there is provided an AAA server. The AAA server comprises a sending module, a receiving module and a deciding module. The sending module may be configured to send a third message related to a secondary authentication and/or authorization of a session of a terminal device to the session management function entity. The receiving module may be configured to receive a fourth message from the session management function entity. The fourth message includes information for indicating that the terminal device has moved to the first network and/or an indication that the secondary authentication and/or authorization of the session of the terminal device is pending. The deciding module may be configured to decide to maintain the session or initiate a session release procedure for releasing the session of the terminal device based on the fourth message.

In another aspect of the disclosure, there is provided a computer program product comprising instructions which, when executed on at least one processor, cause the at least one processor to carry out the method according to any of the first, second, third and fourth aspects of the disclosure.

In another aspect of the disclosure, there is provided a computer-readable storage medium storing instructions which, when executed on at least one processor, cause the at least one processor to carry out the method according to any of the first, second, third and fourth aspects of the disclosure.

Embodiments herein afford many advantages, of which a non-exhaustive list of examples follows. In some embodiments herein, at least one above problem may be solved for the terminal device which initially attaches to the first network such as EPS and moves to the second network such as 5GS during a session life. In some embodiments herein, the session management function entity such as SMF can get the second network (such as 5GS) attributes from the AAA server when the terminal device moves to the second network such as 5GS. In some embodiments herein, the AAA server can have the correct information when triggering the secondary authentication and/or authorization such as re-authentication. The embodiments herein are not limited to the features and advantages mentioned above. A person skilled in the art will recognize additional features and advantages upon reading the following detailed description.

BRIEF DESCRIPTION OF THE DRAWINGS

The above and other aspects, features, and benefits of various embodiments of the present disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which:

FIG. 8 shows a flowchart of a method according to another embodiment of the present disclosure;

DETAILED DESCRIPTION

Figure 1:
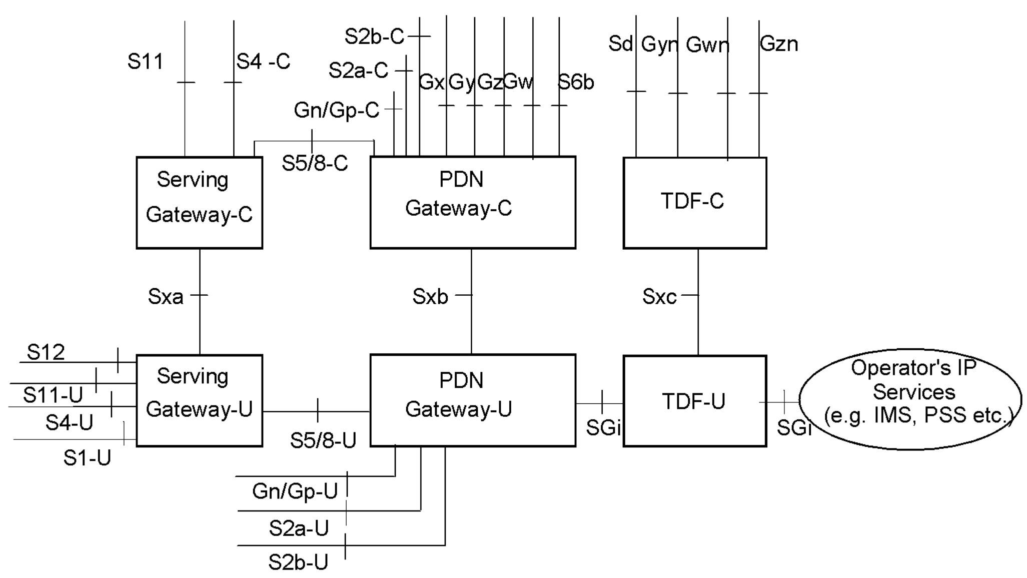
FIG. 1 schematically shows a high level architecture of CUPS in the fourth generation network according to an embodiment of the present disclosure.

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the term "network" refers to a network following any suitable wireless/wired communication standards such as new radio (NR), evolved packet system (EPS), 4G system, 5G system, long term evolution (LTE), LTE-Advanced, wideband code division multiple access (WCDMA), high-speed packet access (HSPA), Code Division Multiple Access (CDMA), Time Division Multiple Address (TDMA), Frequency Division Multiple Access (FDMA), Orthogonal Frequency-Division Multiple Access (OFDMA), Single carrier frequency division multiple access (SC-FDMA) and other wireless networks. A CDMA network may implement a radio technology such as Universal Terrestrial Radio Access (UTRA), etc. UTRA includes WCDMA and other variants of CDMA. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, Ad-hoc network, wireless sensor network, etc. In the following description, the terms "network" and "system" can be used interchangeably. Furthermore, the communications between two devices in the network may be performed according to any suitable communication protocols, including, but not limited to, the communication protocols as defined by some of standards organizations such as 3GPP (3rd Generation Partnership Project). For example, the communication protocols as defined by 3GPP may comprise the third generation (3G), fourth generation (4G), 4.5G, the fourth generation (5G) communication protocols, and/or any other protocols either currently known or to be developed in the future.

The term "network node" used herein refers to a network device or entity such as a core network device in a communication network. For example, in a wireless communication network such as a 3GPP-type cellular network, the network node may be a control plane function node and/or a user plane function node, which may offer numerous services to customers who are interconnected by an access network device. Each access network device is connectable to the core network device over a wired or wireless connection.

The term "network function (NF)" refers to any suitable function which can be implemented in a network entity (physical or virtual) of a communication network. For example, the 5G system (5GS) may comprise a plurality of NFs such as AMF (Access and Mobility Management Function), SMF (Session Management Function), AUSF (Authentication Service Function), UDM (Unified Data Management), PCF (Policy Control Function), AF (Application Function), NEF (Network Exposure Function), UPF (User plane Function) and NRF (Network Repository Function), RAN (radio access network), SCP (service communication proxy), NWDAF (network data analytics function), etc. In other embodiments, the network function may comprise different types of NFs for example depending on the specific network. The 4G system may comprise a plurality of network entities such as mobility management entity (MME) SGW (serving gateway), PGW (packet data network (PDN) gateway), etc. An architecture of control and user plane separation (CUPS) of various network devices such as SGW, PGW, etc. has been introduced in a communication network. In the architecture of CUPS, various interfaces between the control plane nodes (or functions) and the user plane nodes (or functions) have been defined. For example, an Sxb interface is defined between a PGW control plane (PGW-C) and a PGW user plane (PGW-U) and an Sxa interface is defined between a SGW control plane (SGW-C) and a SGW user plane (SGW-U). An N4 interface is defined between a Session Management Function (SMF) and a User Plane Function (UPF). In some embodiments, the network entity or function with same or similar functions in different networks can be referred to as a combined network entity, for example, PGW-C+SMF, PGW-U+UPF, etc.

The term "terminal device" refers to any end device that can access a communication network and receive services therefrom. By way of example and not limitation, the terminal device refers to a mobile terminal, user equipment (UE), or other suitable devices. The UE may be, for example, a Subscriber Station (SS), a Portable Subscriber Station, a Mobile Station (MS), or an Access Terminal (AT). The terminal device may include, but not limited to, a portable computer, an image capture terminal device such as a digital camera, a gaming terminal device, a music storage and a playback appliance, a mobile phone, a cellular phone, a smart phone, a voice over IP (VoIP) phone, a wireless local loop phone, a tablet, a wearable device, a personal digital assistant (PDA), a portable computer, a desktop computer, a wearable terminal device, a vehicle-mounted wireless terminal device, a wireless endpoint, a mobile station, a laptop-embedded equipment (LEE), a laptop-mounted equipment (LME), a USB dongle, a smart device, a wireless customer-premises equipment (CPE) and the like. In the following description, the terms "terminal device", "terminal", "user equipment" and "UE" may be used interchangeably. As one example, a terminal device may represent a UE configured for communication in accordance with one or more communication standards promulgated by the 3GPP (3rd Generation Partnership Project), such as 3GPP' LTE standard or NR standard. As used herein, a "user equipment" or "UE" may not necessarily have a "user" in the sense of a human user who owns and/or operates the relevant device. In some embodiments, a terminal device may be configured to transmit and/or receive information without direct human interaction. For instance, a terminal device may be designed to transmit information to a network on a predetermined schedule, when initiated by an internal or external event, or in response to requests from the communication network. Instead, a UE may represent a device that is intended for sale to, or operation by, a human user but that may not initially be associated with a specific human user.

As yet another example, in an Internet of Things (IoT) scenario, a terminal device may represent a machine or other device that performs monitoring and/or measurements, and transmits the results of such monitoring and/or measurements to another terminal device and/or network equipment. The terminal device may in this case be a machine-to-machine (M2M) device, which may in a 3GPP context be referred to as a machine-type communication (MTC) device. As one particular example, the terminal device may be a UE implementing the 3GPP narrow band internet of things (NB-IoT) standard. Particular examples of such machines or devices are sensors, metering devices such as power meters, industrial machinery, or home or personal appliances, for example refrigerators, televisions, personal wearables such as watches etc. In other scenarios, a terminal device may represent a vehicle or other equipment that is capable of monitoring and/or reporting on its operational status or other functions associated with its operation.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

As used herein, the phrase "at least one of A and B" should be understood to mean "only A, only B, or both A and B." The phrase "A and/or B" should be understood to mean "only A, only B, or both A and B."

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

It is noted that these terms as used in this document are used only for ease of description and differentiation among nodes, devices or networks, etc. With the development of the technology, other terms with the similar/same meanings may also be used.

In the following description and claims, unless defined otherwise, all technical and scientific terms used herein have the same meaning as commonly understood by one of ordinary skills in the art to which this disclosure belongs.

It is noted that some embodiments of the present disclosure are mainly described in relation to the cellular network as defined by 3GPP being used as non-limiting examples for certain exemplary network configurations and system deployments. As such, the description of exemplary embodiments given herein specifically refers to terminology which is directly related thereto. Such terminology is only used in the context of the presented non-limiting examples and embodiments, and does naturally not limit the present disclosure in any way. Rather, any other system configuration or radio technologies may equally be utilized as long as exemplary embodiments described herein are applicable.

Although the subject matter described herein may be implemented in any appropriate type of system using any suitable components, the embodiments disclosed herein are described in relation to a communication system complied with the exemplary system architectures illustrated in FIGS. 1-4, 5*a* and 5*b*. For simplicity, the system architectures of FIGS. 1-4, 5*a* and 5*b* only depict some exemplary elements. In practice, a communication system may further include any additional elements suitable to support communication between terminal devices or between a wireless device and another communication device, such as a landline telephone, a service provider, or any other network node or terminal device. The communication system may provide communication and various types of services to one or more terminal devices to facilitate the terminal devices' access to and/or use of the services provided by, or via, the communication system.

FIG. 1 schematically shows a high level architecture of CUPS in the fourth generation network according to an embodiment of the present disclosure. The 4G network may be EPC (Evolved Packet Core)/E-UTRAN (Evolved Universal Terrestrial Radio Access Network). The system architecture of FIG. 1 is same as the architecture reference model as described in clause 4.2 of 3GPP TS23.214 V16.0.0, the disclosure of which is incorporated by reference herein in its entirety, and may comprise some exemplary network nodes such as serving gateway-C (SGW-C), serving gateway-U (SGW-U), PDN gateway-C (PGW-C), PDN gateway-U (PGW-U), TDF (traffic detection function) control plane (TDF-C) and TDF user plane (TDF-U). As further illustrated in FIG. 1, the exemplary system architecture also contains some interfaces such as Sxa, Sxb, Sxc, etc. Various network nodes shown in FIG. 1 may be responsible for functions for example as defined in 3GPP TS23.214 V16.0.0, the disclosure of which is incorporated by reference herein in its entirety. Each PGW-C may manage/control one or more PGW-Us though only one PGW-U is shown in the system. Each SGW-C may manage/control multiple SGW-Us though only one SGW-U is shown in the system. Each TDF-C may manage/control multiple TDF-Us though only one TDF-U is shown in the system.

Figure 2:
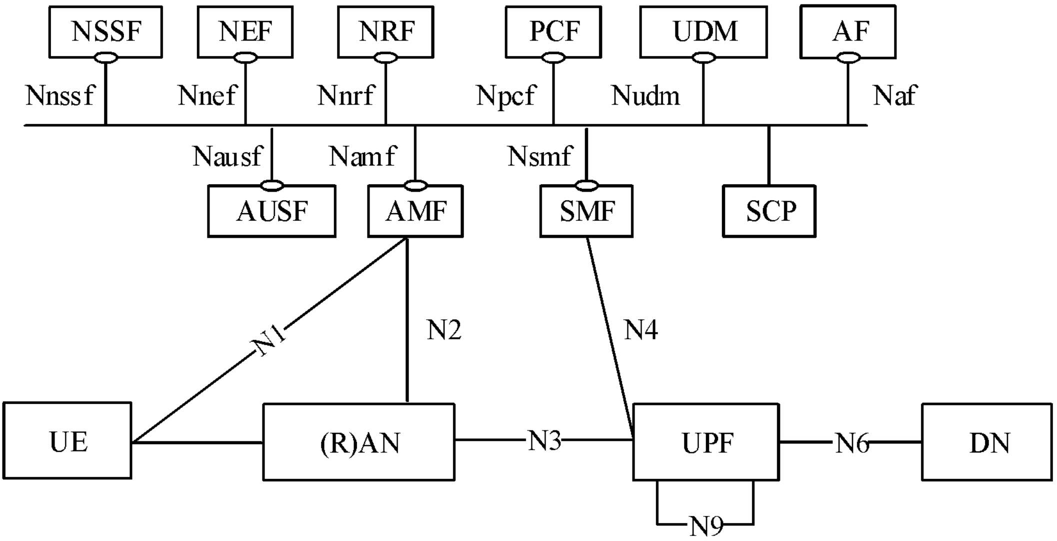
FIG. 2 schematically shows a high level architecture in the fifth generation network according to an embodiment of the present disclosure.

FIG. 2 schematically shows a high level architecture in the fifth generation network according to an embodiment of the present disclosure. For example, the fifth generation network may be 5GS. The architecture of FIG. 2 is same as Figure 4.2.3-1 as described in 3GPP TS 23.501 V16.4.0, the disclosure of which is incorporated by reference herein in its entirety. The system architecture of FIG. 2 may comprise some exemplary elements such as AUSF, AMF, DN (data network), NEF, NRF, NSSF, PCF, SMF, UDM, UPF, AF, UE, (R)AN, SCP (Service Communication Proxy), etc.

In accordance with an exemplary embodiment, the UE can establish a signaling connection with the AMF over the reference point N1, as illustrated in FIG. 2. This signaling connection may enable NAS (Non-access stratum) signaling exchange between the UE and the core network, comprising a signaling connection between the UE and the (R)AN and the N2 connection for this UE between the (R)AN and the AMF. The (R)AN can communicate with the UPF over the reference point N3. The UE can establish a protocol data unit (PDU) session to the DN (data network, e.g. an operator network or Internet) through the UPF over the reference point N6.

As further illustrated in FIG. 2, the exemplary system architecture also contains the service-based interfaces such as Nnrf, Nnef, Nausf, Nudm, Npcf, Namf and Nsmf exhibited by NFs such as the NRF, the NEF, the AUSF, the UDM, the PCF, the AMF and the SMF. In addition, FIG. 2 also shows some reference points such as N1, N2, N3, N4, N6 and N9, which can support the interactions between NF services in the NFs. For example, these reference points may be realized through corresponding NF service-based interfaces and by specifying some NF service consumers and providers as well as their interactions in order to perform a particular system procedure.

Various NFs shown in FIG. 2 may be responsible for functions such as session management, mobility management, authentication, security, etc. The AUSF, AMF, DN, NEF, NRF, NSSF, PCF, SMF, UDM, UPF, AF, UE, (R)AN, SCP may include the functionality for example as defined in clause 6.2 of 3GPP TS23.501 V16.4.0.

Figure 3:
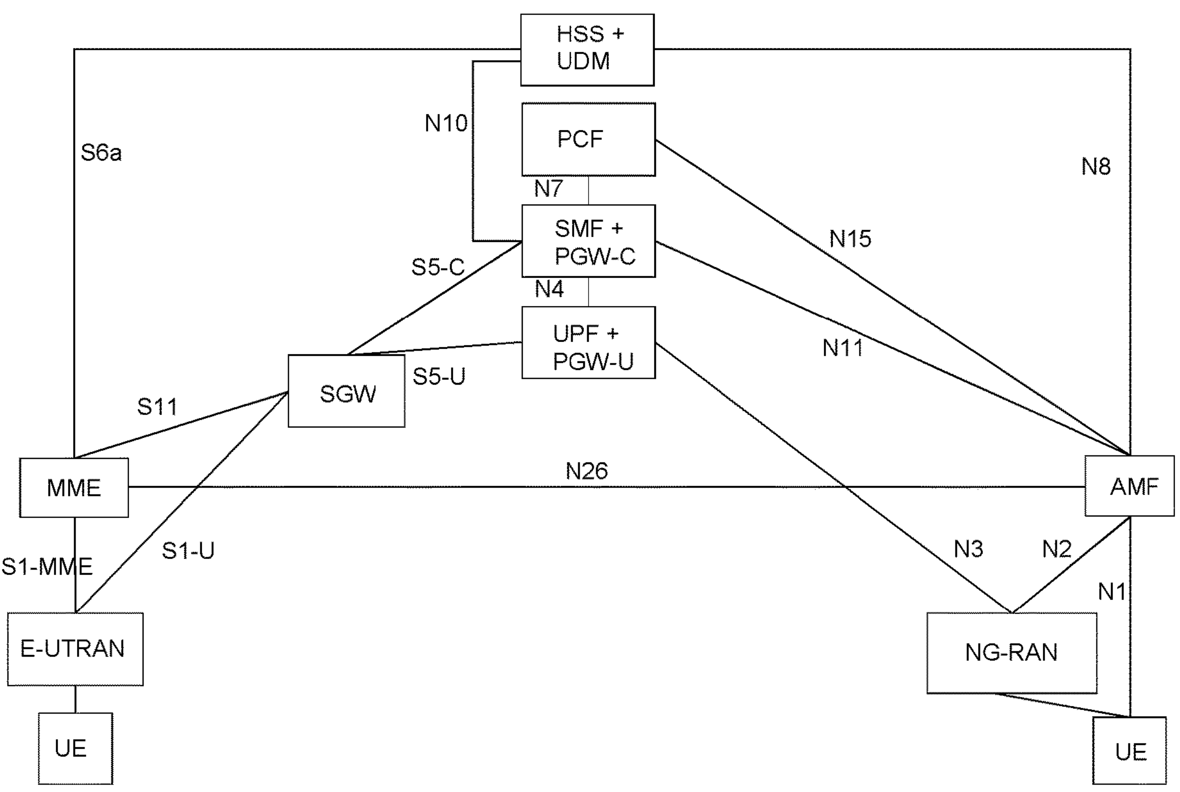
FIG. 3 schematically shows a non-roaming architecture for interworking between 5GS and EPC/E-UTRAN according to an embodiment of the present disclosure.

FIG. 3 schematically shows a non-roaming architecture for interworking between 5GS and EPC (Evolved Packet Core)/E-UTRAN (Evolved Universal Terrestrial Radio Access Network) according to an embodiment of the present disclosure. The architecture for of FIG. 3 is same as Figure 4.3.3-1 as described in 3GPP TS 23.501 V16.4.0.

As shown in FIG. 3, N26 interface is an inter-CN (core network) interface between the MME and 5GS AMF in order to enable interworking between EPC and the NG core. Support of N26 interface in the network is optional for interworking. N26 supports subset of the functionalities (essential for interworking) that are supported over S10. PGW-C+SMF and UPF+PGW-U are dedicated for interworking between 5GS and EPC, which are optional and are based on UE MM (Mobility Management) Core Network Capability and UE subscription. UEs that are not subject to 5GS and EPC interworking may be served by entities not dedicated for interworking, i.e. by either by PGW or SMF/UPF. There can be another UPF (not shown in the FIG. 3) between the NG-RAN (next generation RAN) and the UPF+PGW-U, i.e. the UPF+PGW-U can support N9 towards an additional UPF, if needed. Figures and procedures in this specification that depict an SGW make no assumption whether the SGW is deployed as a monolithic SGW or as an SGW split into its control-plane and user-plane functionality as described in TS 23.214 V16.0.0.

Figure 4:
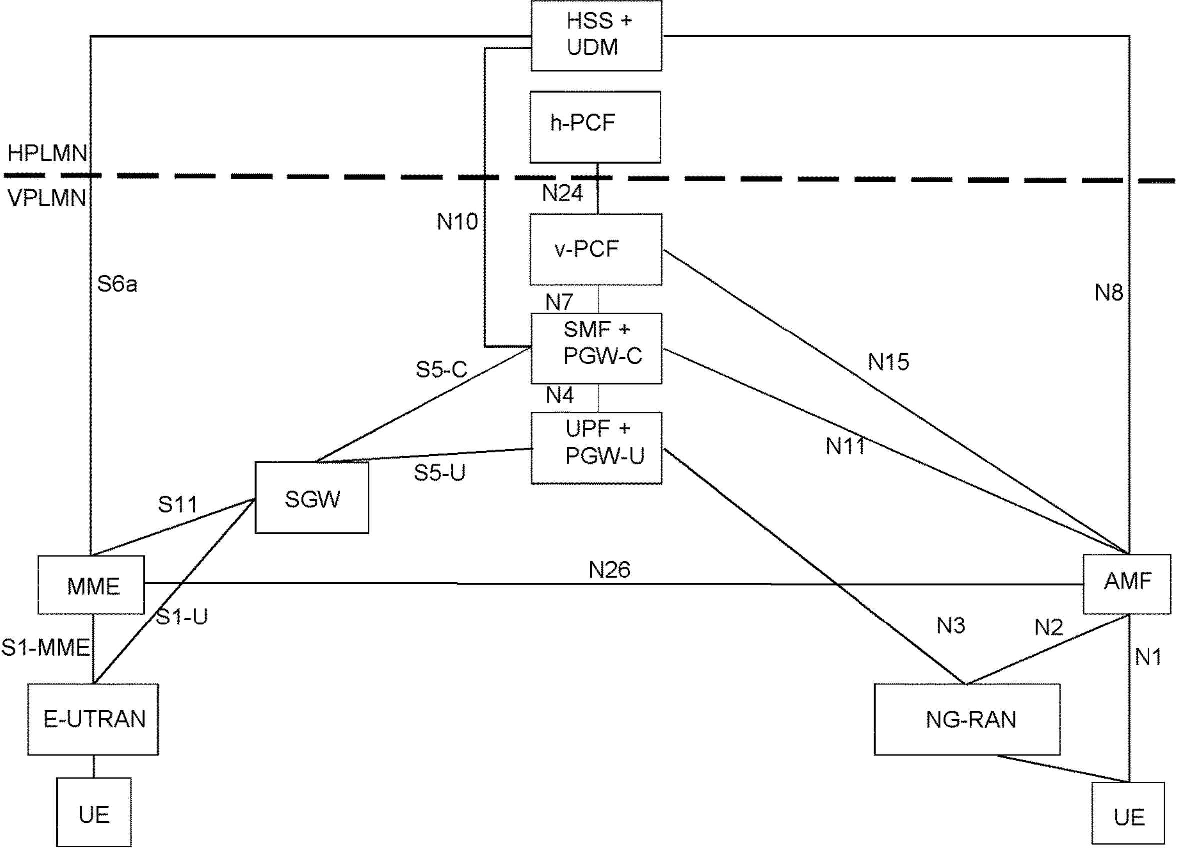
FIG. 4 schematically shows a local breakout roaming architecture for interworking between 5GS and EPC/E-UTRAN.
Figures 5A, 5B:
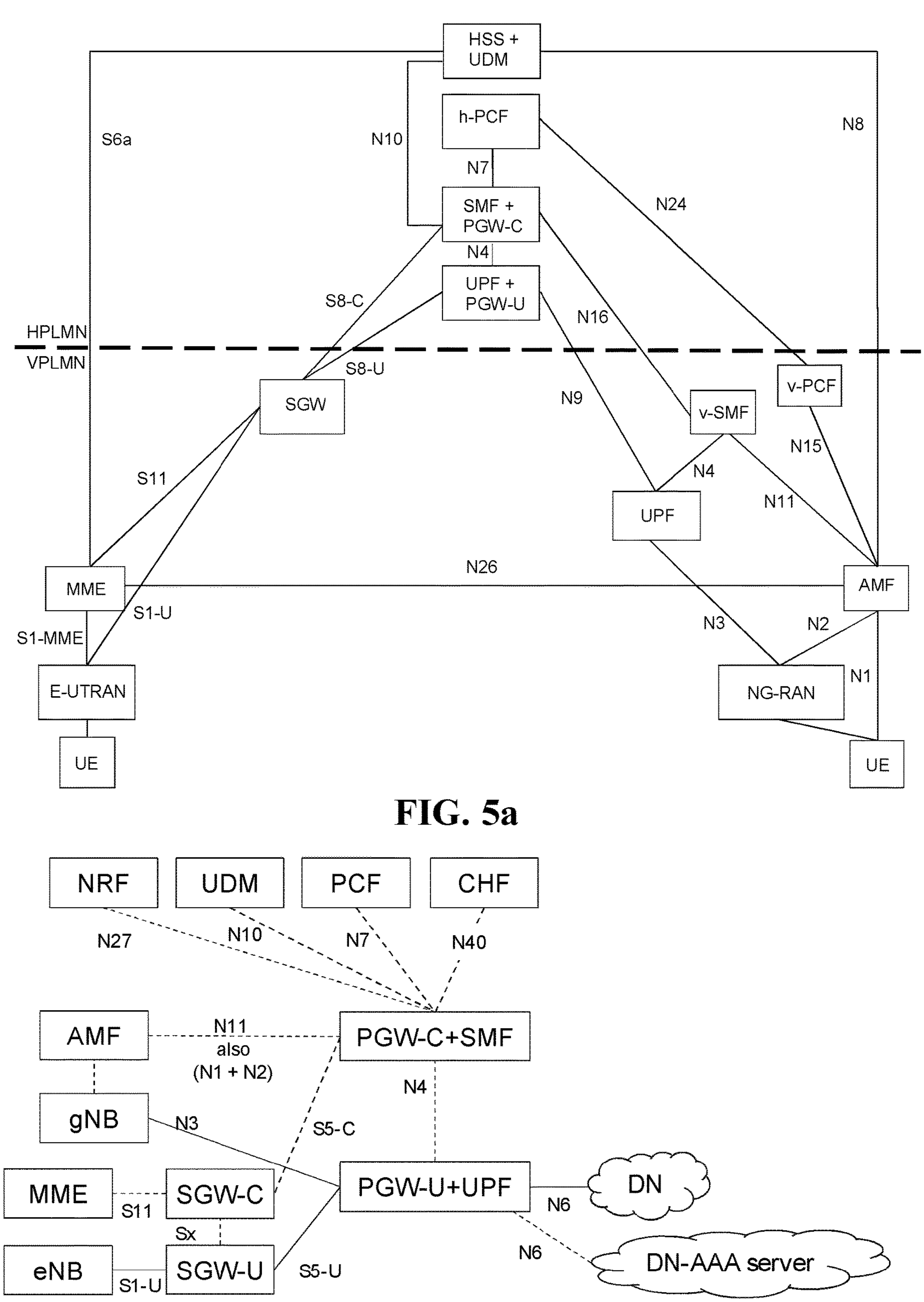
FIG. 5*a* schematically shows a home-routed roaming architecture for interworking between 5GS and EPC/E-UTRAN.
FIG. 5*b* depicts a schematic system, in which some embodiments of the present disclosure can be implemented.

FIG. 4 schematically shows a local breakout roaming architecture for interworking between 5GS and EPC/E-UTRAN. FIG. 5*a* schematically shows a home-routed roaming architecture for interworking between 5GS and EPC/E-UTRAN. The architecture for of FIG. 4 is same as Figure 4.3.2-1 as described in 3GPP TS 23.501 V16.4.0. The architecture for of FIG. 5*a* is same as Figure 4.3.2-2 as described in 3GPP TS 23.501 V16.4.0. As shown in FIG. 4, there can be another UPF (not shown in FIG. 4) between the NG-RAN and the UPF+PGW-U, i.e. the UPF+PGW-U can support N9 towards the additional UPF, if needed. HPLMN denotes Home Public Land Mobile Network. VPLMN denotes Visited Public Land Mobile Network. "h-" denotes Home. "v-" denotes visited CF. HSS denotes Home Subscriber Server.

When data forwarding is used as part of mobility procedures, different user plane routes may be used based on the network configuration (e.g. direct or indirect data forwarding). For example, the indirect data forwarding may be used in an inter system handover procedure from 5GS to EPS or from EPS to 5GS with N26 supported.

FIG. 5*b* depicts a schematic system, in which some embodiments of the present disclosure can be implemented. As shown in FIG. 5*b*, the schematic system comprises NRF, UDM, PCF, CHF (Charging Function), AMF, gNB, MME, SGW-C, PGW-C+SMF, PGW-U+UPF, DN, eNB, SGW-U, DN-AAA server, etc. A reference point such as N6 can support the interactions between DN-AAA and PGW-C+SMF. The DN-AAA server may belong to the 5GC or to the DN. If the DN-AAA server is located in the 5GC and reachable directly, then the SMF may communicate with it directly without involving the UPF.

According to clause 5.6.6 of 3GPP TS 23.501 V16.4.0, at any time, a DN-AAA server may revoke the authorization for a PDU Session or update DN Authorization Data for a PDU Session. According to the request from DN-AAA server, the SMF may release or update the PDU Session. At any time, a DN-AAA server or SMF may trigger Secondary Re-authentication procedure for a PDU Session established with Secondary Authentication. There may be problems. For example, when UE moves from EPC to 5GC, it's not clear/specified whether secondary authorization/authentication should be performed and how to perform. If DN-AAA initiates re-authorization but UE has moved from 5GC to EPC, such re-authorization is not possible. UE may use legacy PAP/CHAP (user-name and user-password from PCO) during PDN connection setup. When UE moves from 4GS and 5GS, SMF doesn't trigger re-authentication request to DN-AAA server, the security problem may happen and SMF cannot get any 5GS special authorization attribute from DN-AAA server. Initial EAP Authentication with an external AAA server happens during PDU session establishment. When UE moves from 5GS to EPS, DN-AAA authentication server doesn't know the UE status, so DN-AAA server can trigger re-authentication procedure when UE is in EPS and the re-authentication procedure should fail because EAP is not used in EPS. DN-AAA authentication server may trigger Disconnect to terminate this PDN connection after getting the failure from SMF+PGW-C. Secondary authentication/authorization may not work properly, e.g., security aspect may be compromised due to UE starting PDN connection from EPS, unexpected PDU Session release due to interworking with EPC.

To overcome or mitigate the above mentioned problem or other problems, the embodiments of the present disclosure propose an improved authentication and authorization solution.

According to various embodiments, the proposed solutions may be applied to any of Mobility between EPS and 5GS with N26 (handover and idle mobility); Mobility between EPS and 5GS without N26; Handover between EPC/ePDG (Evolved Packet Data Gateway) and 5GS or Handover between EPS and 5GC/N3IWF (Non-3GPP Inter-Working Function).

In an embodiment, after UE moves to the first network such as EPC, if the AAA server such as DN-AAA server initiates Secondary Re-authentication procedure, the session management function entity such as PGW-C+SMF shall respond to the AAA server that the re-authentication is pending as it is not applicable for the current system.

In an embodiment, after UE moves to the second network such as 5GC, if there is a pending request of Secondary Re-authentication procedure, the session management function entity such as PGW-C+SMF shall initiate the Secondary Re-authentication procedure, otherwise, the session management function entity such as PGW-C+SMF may decide to initiate the Secondary Re-authentication procedure based on subscription data or a local policy.

In an embodiment, the session management function entity such as SMF+PGW-C may trigger re-authentication procedure with request message to the AAA server such as DN-AAA server when the EAP based authentication is not successful before when UE moves from the first network such as EPS to the second network such as 5GS.

In an embodiment, the session management function entity such as SMF+PGW-C may give the new indication to the AAA server such as DN-AAA server when the AAA server triggers re-authentication with EAP if UE stays in the first network such as EPS and cannot follow EAP based authentication. And after UE moves from the first network such as EPS to the second network such as 5GS, the session management function entity such as SMF+PGW-C triggers re-authentication procedure to the AAA server.

In an embodiment, the session management function entity such as SMF+PGW-C sends a request message or a system change notification to the AAA server when UE moves from the first network such as EPS to the second network such as 5GS or from the second network to the first network, the AAA server can decide to do re-authentication only when UE stays in the second network such as 5GS.

In an embodiment, the session management function entity such as SMF+PGW-C sends a request message or a system change notification to the AAA server when UE moves from the first network such as EPS to the second network such as 5GS and from the second network to the first network, the AAA server can decide to do re-authentication only when UE stays in the second network such as 5GS.

For example, the request message may be any suitable request message. In an embodiment, the request message may comprise the system change notification. In an embodiment, the system change notification may be report of a change between the first network and the second network. In an embodiment, the change between the first network and the second network may comprise a change of core network type or change of Radio Access Technology, RAT, type.

Figure 6:
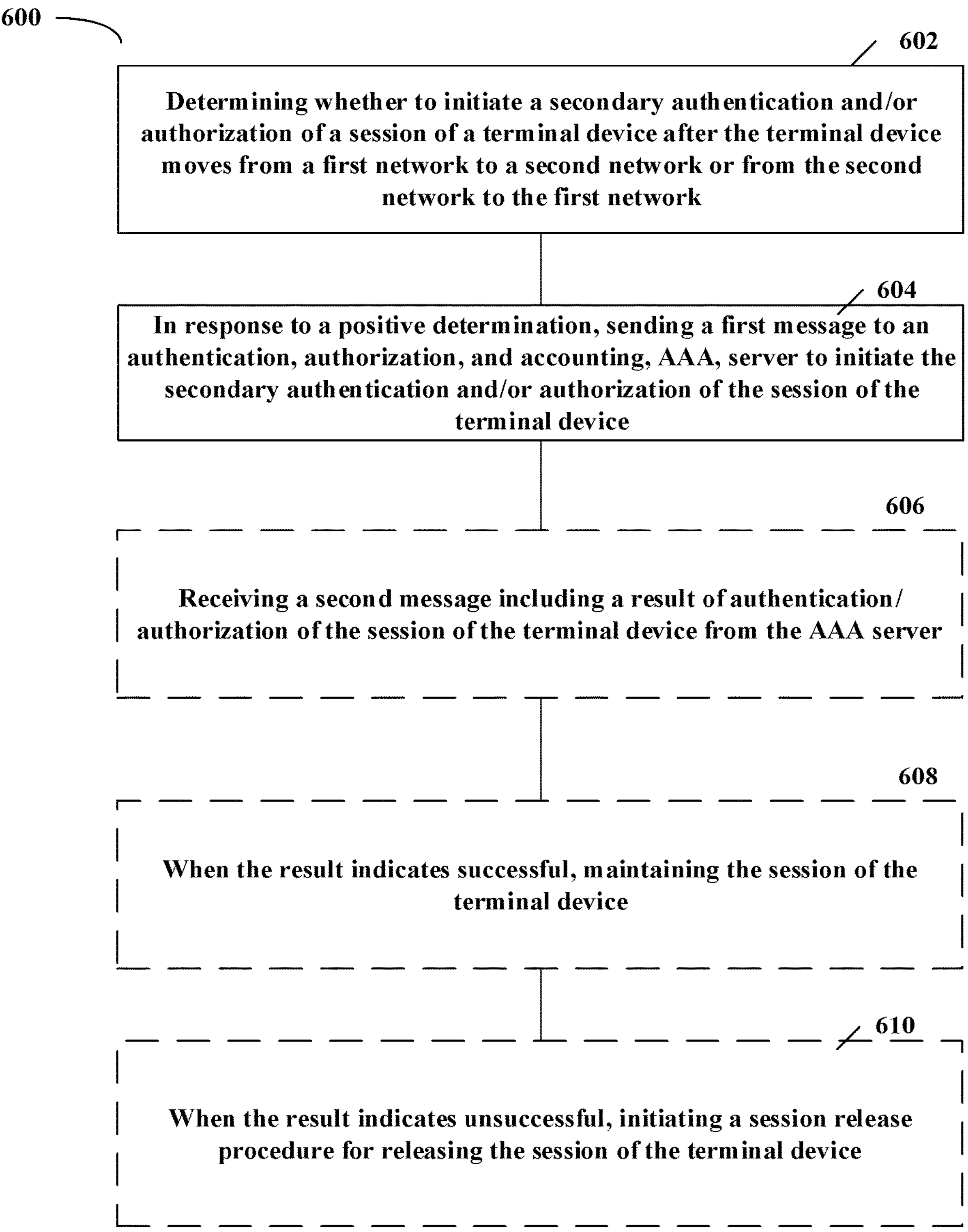
FIG. 6 shows a flowchart of a method according to an embodiment of the present disclosure.

FIG. 6 shows a flowchart of a method according to an embodiment of the present disclosure, which may be performed by an apparatus implemented in a session management function entity or communicatively coupled to the session management function entity. As such, the apparatus may provide means or modules for accomplishing various parts of the method 600 as well as means or modules for accomplishing other processes in conjunction with other components. The session management function entity may be any suitable network node which can implement session management function. For example, the session management function entity may be SMF, SMF+PGW, or SMF+PGW-C, etc.

At block 602, the session management function entity may determine whether to initiate a secondary authentication and/or authorization of a session of a terminal device after the terminal device moves from a first network to a second network or from the second network to the first network. The first network may be any suitable network such as EPS. The second network may be any suitable network such as 5GS.

The term "move" may refer to inter system handover or inter system mobility. For example, it may comprises at least one of 5GS to EPS handover using N26 interface, EPS to 5GS handover using N26 interface, 5GS to EPS Idle mode mobility using N26 interface, EPS to 5GS Mobility Registration Procedure (Idle and Connected State) using N26 interface, 5GS to EPS Mobility, EPS to 5GS Mobility, Handover procedures between EPS and 5GC-N3IWF, or Handover procedures between EPC/ePDG and 5GS as described in 3GPP TS 23.502 V16.4.0.

The secondary authorization/authentication may be same as or similar to the corresponding secondary authorization/authentication as described in 3GPP TS 23.502 V16.4.0 and 3GPP TS 23.501 V16.4.0.

The session management function entity may determine whether to initiate a secondary authentication and/or authorization of a session of a terminal device after the terminal device moves from a first network to a second network or from the second network to the first network in various ways. For example, the session management function entity may determine initiate the secondary authentication and/or authorization of the session of the terminal device after the terminal device moves from a first network to a second network or from the second network to the first network in various ways based on any suitable defined or configured conditions or without any condition. For example, the condition may be time condition, network type condition (such as initiating the secondary authentication and/or authorization when the terminal device moves to 5GS, not initiating the secondary authentication and/or authorization when the terminal device moves to EPS, or initiating the secondary authentication and/or authorization when the terminal device moves to 5GS or EPS), location condition, etc.

For example, if UE established a PDN connection in EPC, and then moves to 5GC, the PGW-C+SMF may initiate Secondary authentication/authorization procedure based on subscription data or local policy or an indication of pending authentication.

In an embodiment, the session management function entity may determine whether to initiate the secondary authentication and/or authorization of the session of the terminal device after the terminal device moves from the first network to the second network based on at least one of subscription data of the terminal device or a local policy of the session management function entity or an indication that the secondary authentication and/or authorization of the session of the terminal device is pending. The subscription data of the terminal device may be obtained from a data management device such as HSS, UDM, etc. The subscription data of the terminal device may include any condition related to the initiation of the secondary authentication and/or authorization of the session of the terminal device after the terminal device moves from the first network to the second network. The local policy of the session management function entity may be configured by the operator. The local policy of the session management function entity may include any condition related to the initiation of the secondary authentication and/or authorization of the session of the terminal device after the terminal device moves from the first network to the second network. The indication that the secondary authentication and/or authorization of the session of the terminal device is pending may be stored in the session management function entity when it is not applicable for the current system to perform the secondary authentication and/or authorization, for example, the AAA server initiates the secondary authentication and/or authorization while the terminal device has moved to the first network such as EPC.

The indication that the secondary authentication and/or authorization of the session of the terminal device is pending may take any suitable form. In an embodiment, the indication that the secondary authentication and/or authorization of the session of the terminal device is pending may be a flag.

In an embodiment, the session management function entity may determine to initiate the secondary authentication and/or authorization of the session of the terminal device after the terminal device moves from the first network to the second network or from the second network to the first network. In this embodiment, the session management function entity may always initiate the secondary authentication and/or authorization of the session of the terminal device after the terminal device moves from the first network to the second network or from the second network to the first network.

At block 604, in response to a positive determination (the session management function entity determines to initiate a secondary authentication and/or authorization of a session of a terminal device after the terminal device moves from a first network to a second network or from the second network to the first network), the session management function entity may send a first message to an authentication, authorization, and accounting (AAA) server to initiate the secondary authentication and/or authorization of the session of the terminal device. The first message may be any suitable message.

For example, the session management function entity such as SMF+PGW-C has a flag when the EAP-based authentication has done successfully. When the session management function entity such as SMF+PGW-C finishes the handover from the first network such as 4G network to the second network such as 5G, the session management function entity such as SMF+PGW-C checks the flag to see EAP-based authentication is done before or not, if it is not done before, the session management function entity such as SMF+PGW-C triggers re-authentication procedure and sends the first message such as Access Request message with a new rat-type to the AAA server.

For example, after the terminal device such as UE moves from the first network such as EPS back to the second network such as 5GS, if there is a pending request of Secondary Re-authentication procedure, the session management function entity such as PGW-C+SMF shall initiate the Secondary Re-authentication procedure as specified in clause 4.3.2.3 of 3GPP TS 23.502 V16.4.0, otherwise, the session management function entity such as PGW-C+SMF may decide to initiate the Secondary Re-authentication procedure based on the subscription data or the local policy.

At block 606, optionally, the session management function entity may receive a second message including a result of authentication/authorization of the session of the terminal device from the AAA server.

In an embodiment, the secondary authentication and/or authorization may be same as the secondary authorization/authentication as described in clause 4.3.2.3 of 3GPP TS 23.502 V16.4.0. The second message may be any suitable message including a result of authentication/authorization in the authentication/authorization.

At block 608, optionally, when the result indicates successful, the session management function entity may maintain the session of the terminal device.

At block 610, optionally, when the result indicates unsuccessful, the session management function entity may initiate a session release procedure for releasing the session of the terminal device. For example, the session release procedure may be same as the PDU Session Release procedure as described in clause 4.23.5.2 of 3GPP TS 23.502 V16.4.0.

For example, the AAA server decides to do re-authentication for this terminal device and sends Access-Challenge with EAP message to the session management function entity such as SMF+PGW-C when the AAA server gets the information that UE changes from the first network such as 4G network to the second network such as 5G. The authentication/authorization information is further transferred to the terminal device via Namf_Communication_N1N2MessageTransfer service and NAS SM (Session Management) Transport message. The terminal device responds to the received authentication/authorization data and such information is transferred in NAS SM Transport message and Nsmf_PDUSession_UpdateSMContext service, then finally sent to the AAA server by the session management function entity such as SMF+PGW-C, via the UPF, in the Access-Request message. These steps can be repeated depending on the authentication/authorization mechanism used (e.g. EAP-TTLS). The session management function entity such as SMF+PGW-C receives the final result of authentication/authorization from the AAA server in the Access-Accept message. If the result is successful, the session such as PDU session is kept. If the result is not successful, SMF can trigger Session Deletion procedure.

In an embodiment, the first message may be a Remote Authentication Dial In User Service (RADIUS) Access-Request or a Diameter-EAP-Request (DER) as described in 3GPP TS 29.561 V16.3.0.

In an embodiment, the second message is a RADIUS Access-Accept or a RADIUS Access-reject or a Diameter-EAP-Answer (DEA) as described in 3GPP TS 29.561 V16.3.0.

Figure 7:
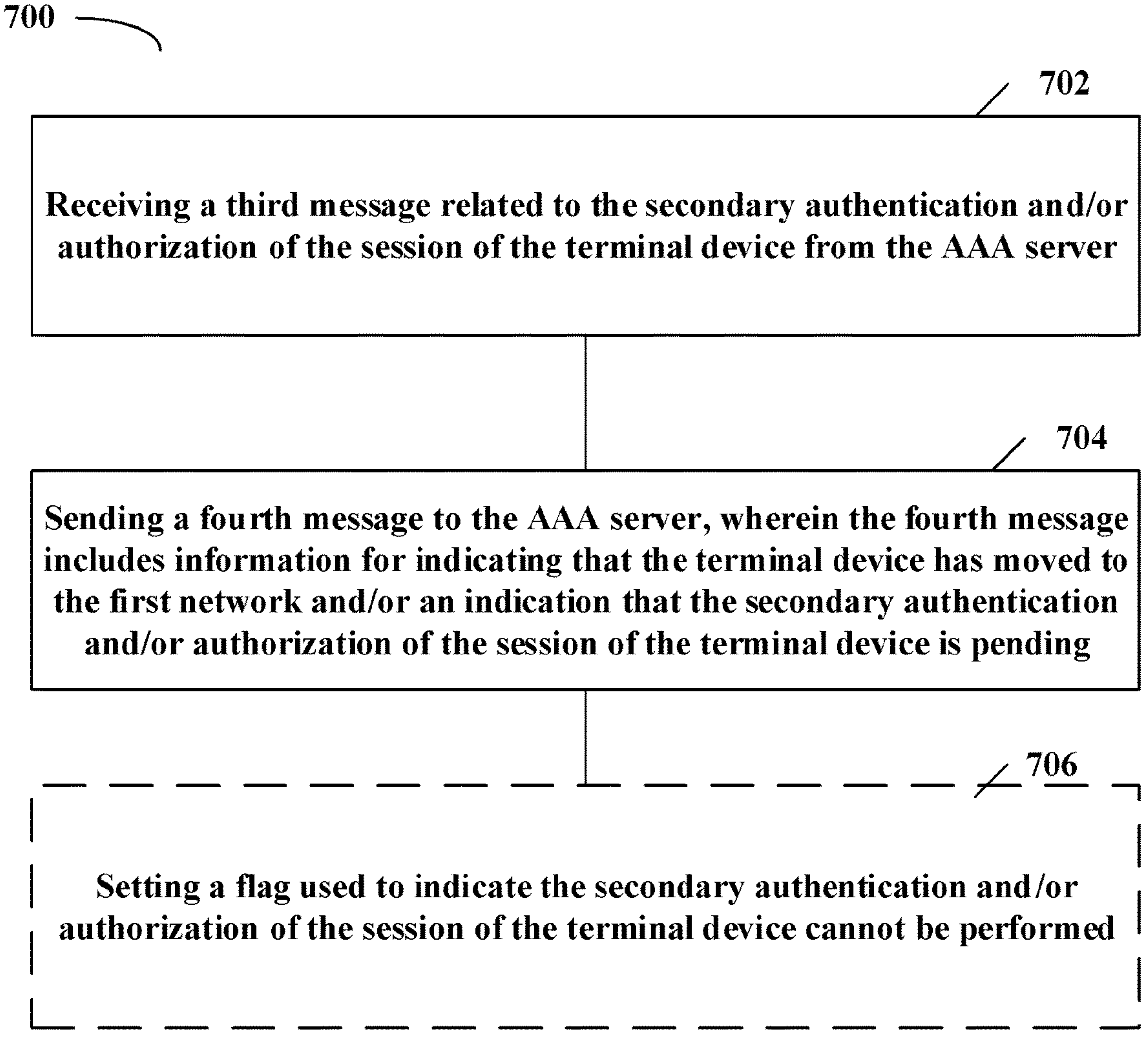
FIG. 7 shows a flowchart of a method according to another embodiment of the present disclosure.

FIG. 7 shows a flowchart of a method according to another embodiment of the present disclosure, which may be performed by an apparatus implemented in a session management function entity or communicatively coupled to the session management function entity. As such, the apparatus may provide means or modules for accomplishing various parts of the method 700 as well as means or modules for accomplishing other processes in conjunction with other components. The session management function entity may be any suitable network node which can implement session management function. For example, the session management function entity may be SMF, SMF+PGW, or SMF+PGW-C, etc.

At block 702, the session management function entity may receive a third message related to the secondary authentication and/or authorization of the session of the terminal device from the AAA server. The third message may be any suitable message. For example, according to 3GPP TS 23.501 V16.4.0, at any time, a DN-AAA server may revoke the authorization for a PDU Session or update DN Authorization Data for a PDU Session. At any time, a DN-AAA server may trigger Secondary Re-authentication procedure for a PDU Session established with Secondary Authentication. Then the session management function entity such as SMF may receive a third message related to the secondary authentication and/or authorization of the session of the terminal device from the AAA server.

At block 704, the session management function entity may send a fourth message to the AAA server. The fourth message may be any suitable message. The fourth message includes information for indicating that the terminal device has moved to the first network and/or an indication that the secondary authentication and/or authorization of the session of the terminal device is pending. For example, the session management function entity such as SMF+PGW-C may send a message with a new indication to indicate the terminal device is in 4G network such as EPS. The AAA server can decide not to trigger disconnect for this UE when receiving this message. In an embodiment, the session management function entity sends the indication that the secondary authentication and/or authorization of the session of the terminal device is pending to the AAA server. In addition, the session management function entity such as SMF+PGW-C may delete a flag which indicates the secondary authentication and/or authorization such as EAP-based authentication has already done.

In an embodiment, when the DN-AAA server initiates secondary authentication/authorization while the UE has moved to EPC, the PGW-C+SMF shall inform the DN-AAA that the authentication/authorization is pending as it is not applicable for the current system, and DN-AAA may decide to maintain the PDU Session or initiate PDU Session release. When the UE moves back to 5GC, the PGW-C+SMF may initiate the Secondary authentication/authorization towards the DN-AAA if there is a pending request.

At block 706, optionally, the session management function entity may set a flag used to indicate the secondary authentication and/or authorization of the session of the terminal device cannot be performed.

In an embodiment, the third message is a Remote Authentication Dial In User Service, (RADIUS) Change-of-Authorization (CoA) request or a Diameter Re-Auth-Request (RAR) as described in 3GPP TS 29.561 V16.3.0.

In an embodiment, the fourth message is a RADIUS CoA response or a Diameter Re-Auth-Answer (RAA) as described in 3GPP TS 29.561 V16.3.0.

In an embodiment, at least one authentication method of the secondary authentication uses an Extensible Authentication Protocol (EAP).

In an embodiment, the AAA server is a data network AAA (DN-AAA) server.

In an embodiment, the DN-AAA server is a Remote Authentication Dial In User Service (RADIUS) Authentication server or a Diameter Authentication server.

In an embodiment, the session of the terminal device is a protocol data unit (PDU) session.

In an embodiment, the first network is an evolved packet system (EPS) and the second network is a fifth generation system (5GS).

In an embodiment, the first message comprises a report of a change between the first network and the second network. For example, the session management function entity always sends the first message such as Access-Request message to the AAA server when the terminal device moves between first network such as EPS and the second network such as 5GS, and the AAA server can decide to when to do re-authentication for this UE. For example, the session management function entity such as SMF+PGW-C sends Access-Request message to the AAA server when UE moves from 5GS to EPS or from EPS to 5GS with the changed 3GPP-Rat-type, the AAA server can decide to do re-authentication only when UE stays in 5GS.

In an embodiment, the change between the first network and the second network comprises a change of core network type (such as between EPC and 5GC) or change of Radio Access Technology (RAT) type (e.g. between NR and EUTRA (Evolved UMTS (Universal Mobile Telecommunications System) Terrestrial Radio Access)).

In an embodiment, after the terminal device such as UE moves to the first network such as EPS, if the AAA server initiates Secondary Re-authentication procedure (as specified in clause 4.3.2.3 of 3GPP TS 23.502 V16.4.0), the session management function entity such as PGW-C+SMF may respond to the AAA that the re-authentication is pending as it not applicable for the current system.

In an embodiment, the session management function entity may first perform method 600 and then perform method 700. In another embodiment, the session management function entity may first perform method 700 and then perform method 600. The methods 600 may be performed several times. The methods 700 may be performed several times.

FIG. 8 shows a flowchart of a method according to another embodiment of the present disclosure, which may be performed by an apparatus implemented in the AAA server or communicatively coupled to the AAA server. As such, the apparatus may provide means or modules for accomplishing various parts of the method 800 as well as means or modules for accomplishing other processes in conjunction with other components. The AAA server may be any suitable server which can implement authentication, authorization, and accounting function. For example, the AAA server may be DN AAA, etc. For some parts which have been described in the above embodiments, the description thereof is omitted here for brevity.

At block 802, the AAA server may receive a first message from a session management function entity to initiate a secondary authentication and/or authorization of a session of a terminal device.

At block 804, the AAA server may determine whether to initiate the secondary authentication and/or authorization of the session of the terminal device based on the first message. The secondary authentication and/or authorization of the session of the terminal device is determined to be initiated after the terminal device moves from a first network to a second network or from the second network to the first network.

In an embodiment, secondary authentication and/or authorization of the session of the terminal device is determined to be initiated after the terminal device moves from the first network to the second network based on at least one of subscription data of the terminal device or a local policy of the session management function entity or an indication that the secondary authentication and/or authorization of the session of the terminal device is pending; or the secondary authentication and/or authorization of the session of the terminal device is determined to be initiated after the terminal device moves from the first network to the second network or from the second network to the first network.

In an embodiment, the first message comprises a report of a change between the first network and the second network. For example, the session management function entity always sends the first message such as Access-Request message to the AAA server when the terminal device moves between first network such as EPS and the second network such as 5GS, and the AAA server can decide to when to do re-authentication for this UE. For example, the session management function entity such as SMF+PGW-C sends Access-Request message to the AAA server when UE moves from 5GS to EPS or from EPS to 5GS with the changed 3GPP-Rat-type, the AAA server can decide to do re-authentication only when UE stays in 5GS.

In an embodiment, the session management function entity such as SMF+PGW-C may trigger re-authentication procedure with the first message to the AAA server when the EAP based authentication is not successful before when the terminal device moves from the first network such as EPS to the second network such as 5GS.

In an embodiment, the session management function entity such as SMF+PGW-C sends the first message with a report of the change between the first network and the second network to the AAA server when the terminal device moves from the first network to the second network or from the second network to the first network, the AAA server can decide to do re-authentication only when the terminal device stays in the second network such as 5GS.

At block 806, optionally, the AAA server may send a second message including a result of authentication/authorization of the session of the terminal device to the session management function entity.

In an embodiment, the secondary authentication and/or authorization may be same as the secondary authorization/authentication as described in clause 4.3.2.3 of 3GPP TS 23.502 V16.4.0. The second message may be any suitable message including a result of authentication/authorization in the authentication/authorization.

Figure 9:
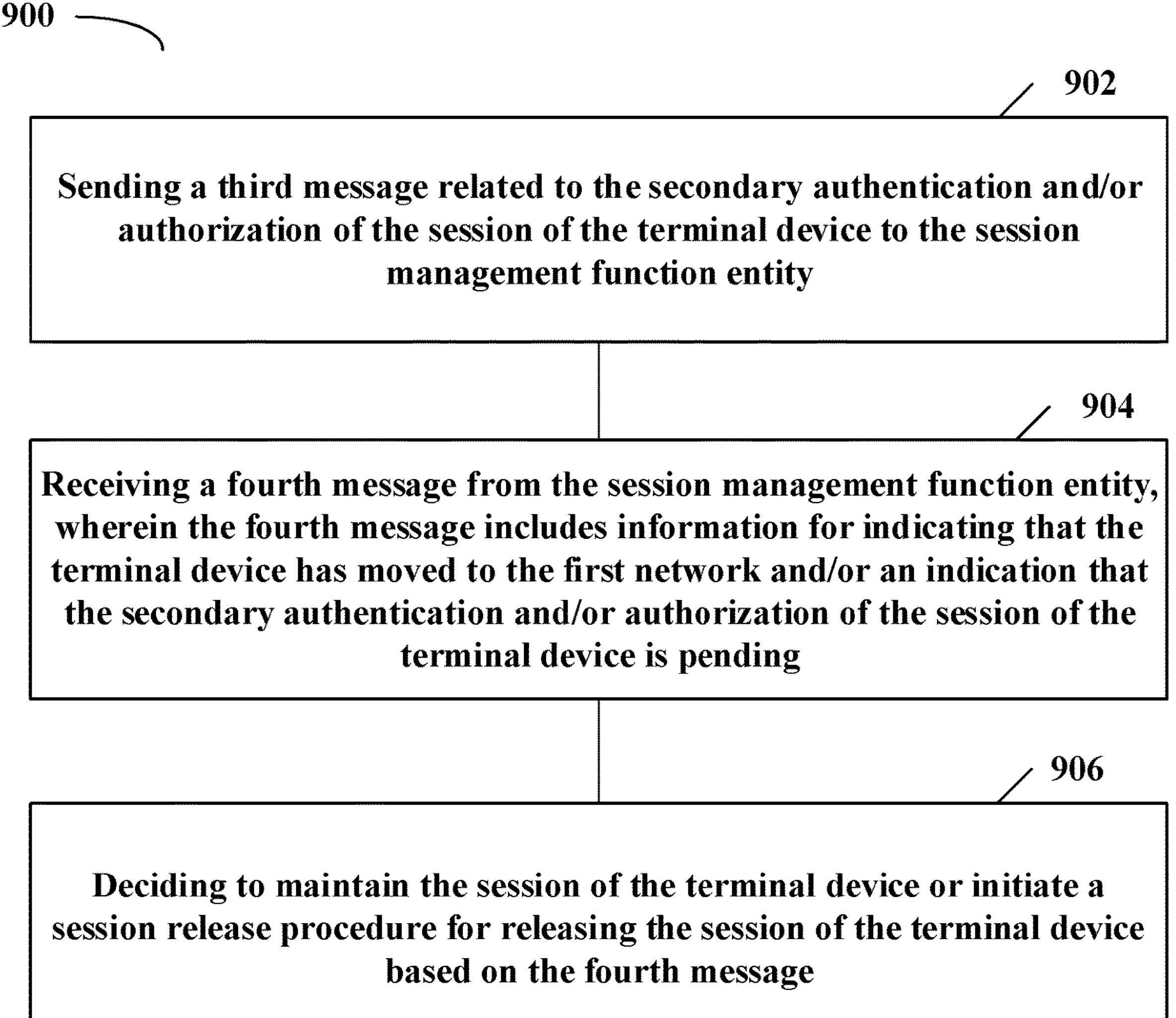
FIG. 9 shows a flowchart of a method according to another embodiment of the present disclosure.

FIG. 9 shows a flowchart of a method according to another embodiment of the present disclosure, which may be performed by an apparatus implemented in the AAA server or communicatively coupled to the AAA server. As such, the apparatus may provide means or modules for accomplishing various parts of the method 900 as well as means or modules for accomplishing other processes in conjunction with other components. The AAA server may be any suitable server which can implement authentication, authorization, and accounting function. For example, the AAA server may be DN AAA, etc. For some parts which have been described in the above embodiments, the description thereof is omitted here for brevity.

At block 902, the AAA server may send a third message related to the secondary authentication and/or authorization of the session of the terminal device to the session management function entity.

At block 904, the AAA server may receive a fourth message from the session management function entity, wherein the fourth message includes information for indicating that the terminal device has moved to the first network and/or an indication that the secondary authentication and/or authorization of the session of the terminal device is pending.

At block 906, the AAA server may decide to maintain the session of the terminal device or initiate a session release procedure for releasing the session of the terminal device based on the fourth message.

As a first example, the session management function entity such as SMF+PGW-C may give the new indication to the AAA server when the AAA server triggers re-authentication with EAP if the terminal device stays in the first network such as EPS and cannot follow EAP based authentication. In this case, the AAA server may decide to maintain the session of the terminal device. After the terminal device moves from the first network such as EPS to the second network such as 5GS, the session management function entity such as SMF+PGW-C may trigger re-authentication procedure to the AAA server. Alternatively, the AAA server may initiate a session release procedure for releasing the session of the terminal device based on the fourth message.

As a second example, the session management function entity such as SMF+PGW-C sends a request message to the AAA server when the terminal device such as UE moves from the second network such as 5GS to the first network such as EPS or from the first network to the second network, the AAA server can decide to do re-authentication only when UE stays in the second network such as 5GS.

In an embodiment, the AAA server may first perform method 800 and then perform method 900. In another embodiment, the AAA server may first perform method 900 and then perform method 800. The methods 700 may be performed several times. The methods 800 may be performed several times.

Figure 10:
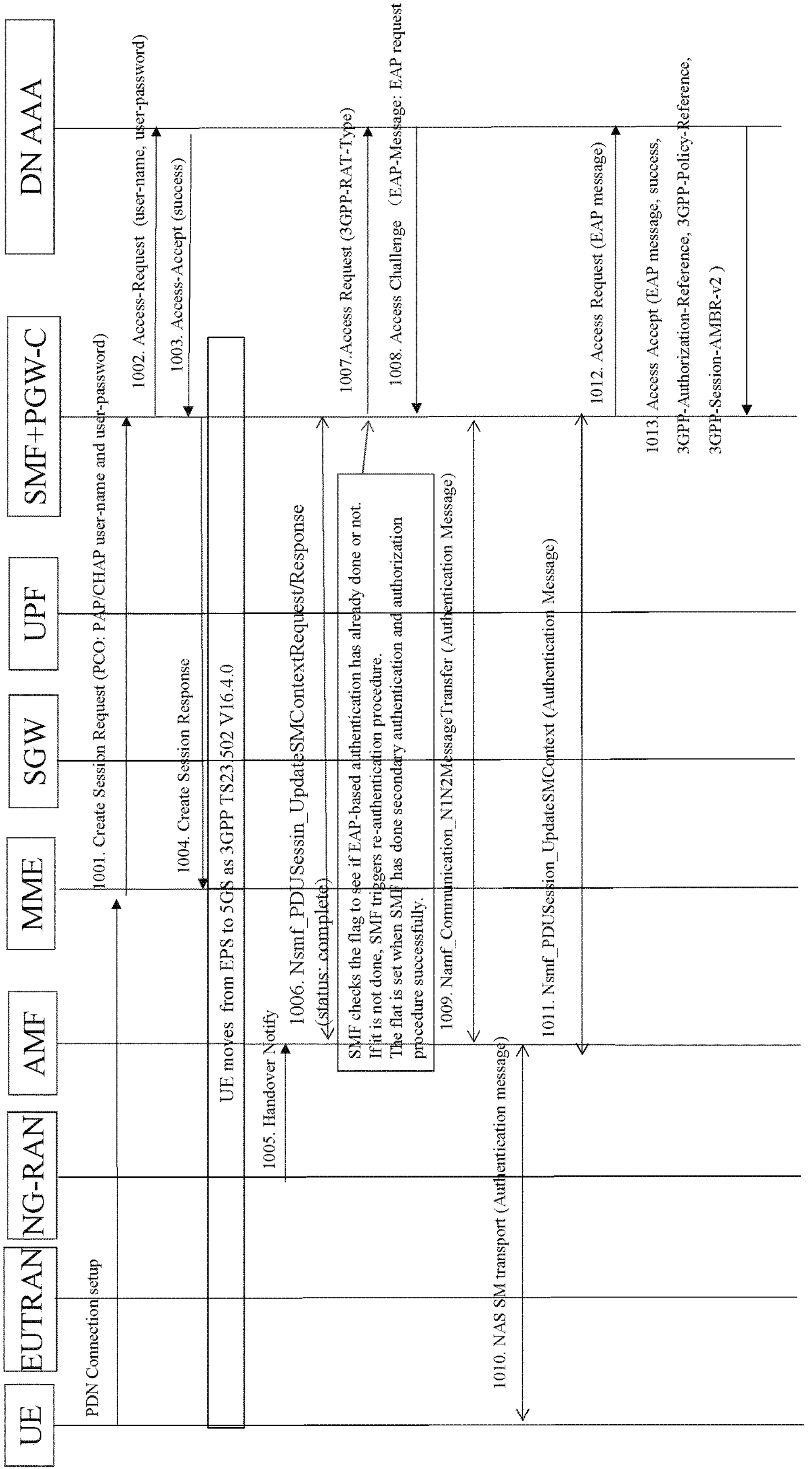
FIG. 10 shows a flowchart of a method according to another embodiment of the present disclosure.

FIG. 10 shows a flowchart of a method according to another embodiment of the present disclosure. In this embodiment, the RADIUS interface and the EPS to 5GS handover are shown for example. As shown in FIG. 10, the terminal device such as UE triggers Initial attach or PDN connection setup procedure.

Step 1001: MME sends a Create Session Request with PCO (PAP/CHAP user-name and user-password) to SMF+PGW.

Step 1002 and Step 1003: SMF+PGW-C triggers authentication procedure based on local policy, DN-AAA server authenticate the user with legacy PAP/CHAP (user-name and user-password).

Step 1004: If the authentication is successful, SMF+PGW-C send Create Session Response to setup this PDN connection. And finally the PDN connection is setup successfully.

Step 1005: UE moves from EPS to 5GS, e.g. if handover from EPS to 5GS happens, the NG-RAN sends Hanover Notify to AMF.

Step 1006: AMF sends Nsmf_PDUSession_UpdateSMContext request with handover status as complete to SMF+PGW-C, SMF+PGW-C sends Nsmf_PDUSession_UpdateSMContext response to AMF and considers the handover is finished.

Step 1007: SMF+PGW-C has a flag when the EAP-based authentication has done successfully. When SMF+PGW-C finishes the handover from EPS to 5GS, SMF+PGW-C checks the flag to see EAP-based authentication is done before or not, if it is not done before, SMF+PGW-C triggers re-authentication procedure, sends Access Request message with the new rat-type to DN-AAA authentication server.

Steps 1008-1012: DN-AAA server decides to do re-authentication for this UE and sends Access-Challenge with EAP message to SMF+PGW-C when DN-AAA server gets the information that UE changes from EPS to 5GS. The authentication/authorization information is further transferred to UE via Namf_Communication_N1N2MessageTransfer service and NAS SM Transport message. UE responds to the received authentication/authorization data and such information is transferred in NAS SM Transport message and Nsmf_PDUSession_UpdateSMContext service, then finally sent to the DN-AAA by the SMF, via the UPF, in the Access-Request message. Steps 1008-1012 can be repeated depending on the authentication/authorization mechanism used (e.g. EAP-TTLS).

Step 1013: The SMF+PGW-C receives the final result of authentication/authorization from the DN-AAA in the Access-Accept message. If the result is successful, the PDU session is kept. If the result is not successful, SMF can trigger Session Deletion procedure.

The same procedure happens if SMF+PGW connects to diameter AAA for authentication and authorization. In that procedure, diameter messages DER and DEA replace the radius message Access-Request, Access-Challenge and Access-Accept.

The messages as shown in FIG. 10 may be same as or similar to the corresponding messages as shown in 3GPP TS 23.401 V16.6.0 or 3GPP TS 23.502 V16.4.0.

Figure 11:
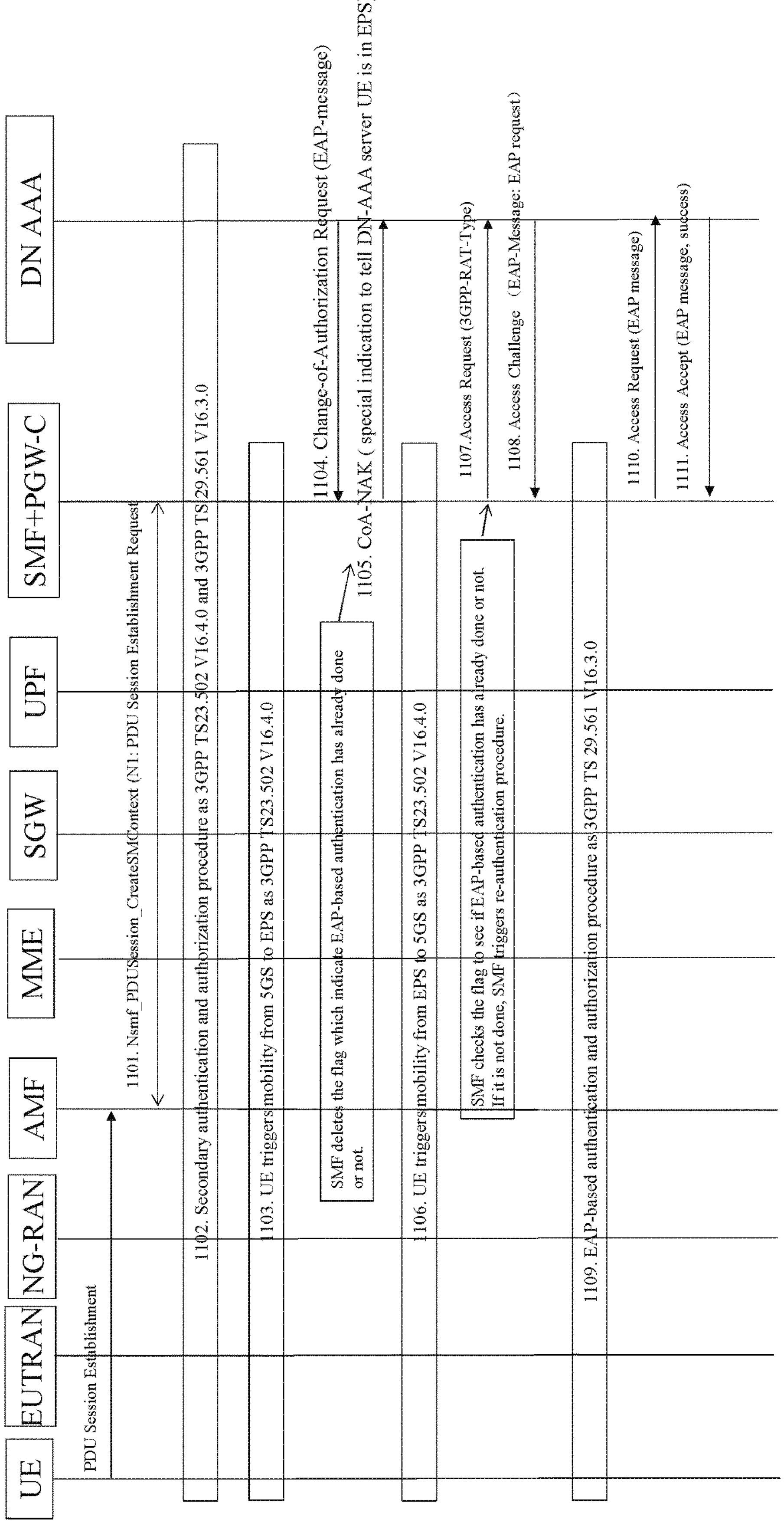
FIG. 11 shows a flowchart of a method according to another embodiment of the present disclosure.

FIG. 11 shows a flowchart of a method according to another embodiment of the present disclosure. In this embodiment, the RADIUS interface and the EPS to 5GS handover are shown for example. Radius re-authentication (UE moves from 4G to 5G, re-authentication happens after handover completes) triggered by DN-AAA server is shown in FIG. 11.

Steps 1101-1102: UE triggers PDU Session Establishment procedure, SMF+PGW-C receives the request message and triggers to do secondary authentication and authorization procedure based on local configuration.

Step 1103: UE triggers mobility from 5GS to EPS.

Step 1104: DN-AAA server triggers re-authentication procedure with CoA message.

Step 1105: SMF+PGW-C sends CoA response with a new indicate to indicate UE is in 4G. So DN-AAA server can decide not to trigger disconnect for this UE. At the same time SMF+PGW-C delete the flag which indicate the EAP-based authentication has already done.

Step 1106: UE triggers mobility from EPS to 5GS.

Step 1107: SMF+PGW-C triggers re-authentication procedure for this UE because SMF+PGW-C considers it is not done before.

Steps 1108-1110: DN-AAA server decides to do re-authentication for this UE and sends Access-Challenge with EAP message to SMF+PGW-C when DN-AAA server gets the information that UE changes from 4G to 5G. The authentication/authorization information is further transferred to UE via Namf_Communication_N1N2MessageTransfer service and NAS SM Transport message. UE responds to the received authentication/authorization data and such information is transferred in NAS SM Transport message and Nsmf_PDUSession_UpdateSMContext service, then finally sent to the DN-AAA.

Step 1111: The SMF+PGW-C receives the final result of authentication/authorization from the DN-AAA in the Access-Accept message. If the result is successful, the PDU session is kept. If the result is not successful, SMF can trigger Session Deletion procedure.

The same procedure happens if SMF+PGW connects to diameter AAA for authentication and authorization. In that procedure, diameter messages diameter RAR replaces the CoA message for radius and diameter RAA replaces the radius message CoA response, the special result-code is needed to indicate the UE is in EPS now.

The messages as shown in FIG. 11 may be same as or similar to the corresponding messages as shown in 3GPP TS 23.401 V16.6.0 or 3GPP TS 23.502 V16.4.0.

In an embodiment, the underlined content may be added in clause 5.17 of 3GPP TS 23.501 V16.4.0.

5.17 Interworking and Migration 5.17.x Secondary Authentication/Authorization at EPC-5GC Interworking If UE established a PDN connection in EPC, and then moves to 5GC, the PGW-C+SMF may initiate Secondary authentication/authorization procedure based on subscription data or local policy or an indication of pending authentication.

For a PDU Session established with secondary authentication/authorization (as specified in clause 5.6.6), the DN- AAA server may initiate secondary authentication/authorization at any time. If the DN-AAA server initiates secondary authentication/authorization while the UE has moved to EPC, the PGW-C+SMF shall inform the DN-AAA that the authentication/authorization is pending as it is not applicable for the current system, and DN-AAA may decide to maintain the PDU Session or initiate PDU Session release. When the UE moves back to 5GC, the PGW-C+SMF shall initiate the Secondary authentication/authorization towards the DN-AAA if there is a pending request.

In an embodiment, the underlined content may be added in clause 4.11.1.2.1 of 3GPP TS 23.502 V16.4.0.

4.11.1.2.1 5GS to EPS Handover Using N26 Interface

After UE moves to the EPS, if the DN-AAA server initiates Secondary Re-authentication procedure (as specified in clause 4.3.2.3), the PGW-C+SMF shall respond to the DN-AAA that the re-authentication is pending as it not applicable for the current system.

In an embodiment, the underlined content may be added in clause 4.11.1.2.2 of 3GPP TS 23.502 V16.4.0.

4.11.1.2.2 EPS to 5GS Handover Using N26 Interface 4.11.1.2.2.1 General

After UE moves from EPS back to 5GS, if there is pending request of Secondary Re-authentication procedure, the PGW-C+SMF shall initiate the Secondary Re-authentication procedure as specified in clause 4.3.2.3, otherwise, the PGW-C+SMF may decide to initiate the Secondary Re-authentication procedure based on subscription data or local policy.

In an embodiment, the underlined content may be added in clause 4.11.1.3.2 of 3GPP TS 23.502 V16.4.0.

4.11.1.3.2 5GS to EPS Idle Mode Mobility Using N26 Interface

After UE moves to the EPS, if the DN-AAA server initiates Secondary Re-authentication procedure (as specified in clause 4.3.2.3), the PGW-C+SMF shall respond to the DN-AAA that the re-authentication is pending as it not applicable for the current system.

In an embodiment, the underlined content may be added in clause 4.11.1.3.3 of 3GPP TS 23.502 V16.4.0.

4.11.1.3.3 EPS to 5GS Mobility Registration Procedure (Idle and Connected State) Using N26 Interface After UE moves from EPS back to 5GS, if there is pending request of Secondary Re-authentication procedure, the PGW-C+SMF shall initiate the Secondary Re-authentication procedure as specified in clause 4.3.2.3, otherwise, the PGW-C+SMF may decide to initiate the Secondary Re-authentication procedure based on subscription data or local policy.

In an embodiment, the underlined content may be added in clause 4.11.2.2 of 3GPP TS 23.502 V16.4.0.

4.11.2.2 5GS to EPS Mobility

After UE moves to the EPS, if the DN-AAA server initiates Secondary Re-authentication procedure (as specified in clause 4.3.2.3), the PGW-C+SMF shall respond to the DN-AAA that the re-authentication is pending as it not applicable for the current system.

In an embodiment, the underlined content may be added in clause 4.11.2.3 of 3GPP TS 23.502 V16.4.0.

4.11.2.3 EPS to 5GS Mobility

After UE moves from EPS back to 5GS, if there is pending request of Secondary Re-authentication procedure, the PGW-C+SMF shall initiate the Secondary Re-authentication procedure as specified in clause 4.3.2.3, otherwise, the PGW-C+SMF may decide to initiate the Secondary Re-authentication procedure based on subscription data or local policy.

In an embodiment, the underlined content may be added in clause 4.11.3.1 of 3GPP TS 23.502 V16.4.0.

4.11.3 Handover Procedures Between EPS and 5GC-N3IWF 4.11.3.1 Handover from EPS to 5GC-N3IWF After UE moves from EPS to 5GC/N3IWF, if there is pending request of Secondary Re-authentication procedure, the PGW-C+SMF shall initiate the Secondary Re-authentication procedure as specified in clause 4.3.2.3, otherwise, the PGW-C+SMF may decide to initiate the Secondary Re-authentication procedure based on subscription data or local policy.

In an embodiment, the underlined content may be added in clause 4.11.3.2 of 3GPP TS 23.502 V16.4.0.

4.11.3.2 Handover from 5GC-N3IWF to EPS

After UE moves to the EPS, if the DN-AAA server initiates Secondary Re-authentication procedure (as specified in clause 4.3.2.3), the PGW-C+SMF shall respond to the DN-AAA that the re-authentication is pending as it not applicable for the current system.

In an embodiment, the underlined content may be added in clause 4.11.4.1 of 3GPP TS 23.502 V16.4.0.

4.11.4 Handover Procedures Between EPC/ePDG and 5GS 4.11.4.1 Handover from EPC/ePDG to 5GS After UE moves to 5GS, if there is pending request of Secondary Re-authentication procedure, the PGW-C+SMF shall initiate the Secondary Re-authentication procedure as specified in clause 4.3.2.3, otherwise, the PGW-C+SMF may decide to initiate the Secondary Re-authentication procedure based on subscription data or local policy.

In an embodiment, the underlined content may be added in clause 4.11.4.2 of 3GPP TS 23.502 V16.4.0.

4.11.4.2 Handover from 5GS to EPC/ePDG

After UE moves to the EPC, if the DN-AAA server initiates Secondary Re-authentication procedure (as specified in clause 4.3.2.3), the PGW-C+SMF shall respond to the DN-AAA that the re-authentication is pending as it not applicable for the current system.

Figure 12:
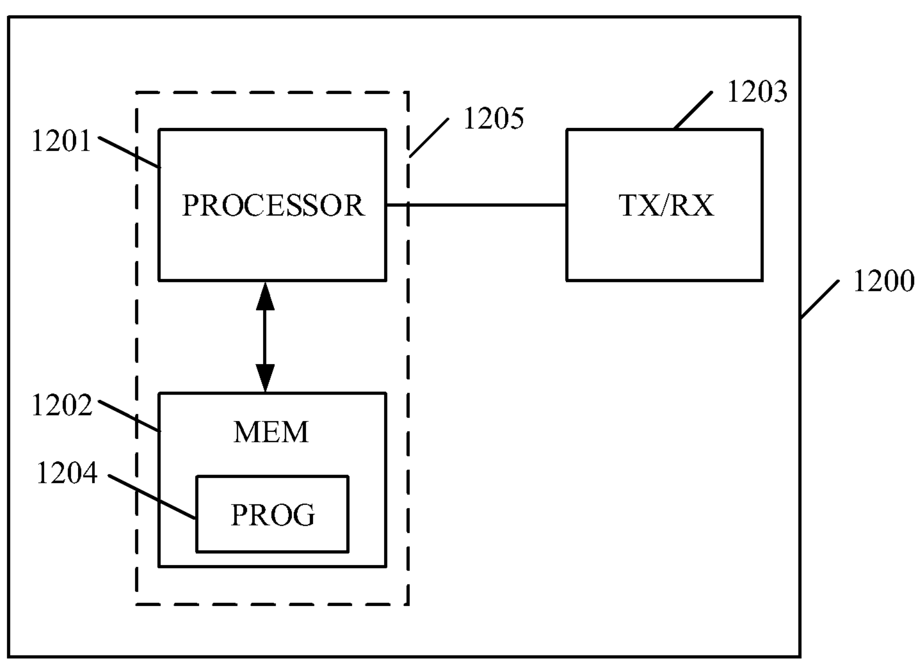
FIG. 12 is a block diagram showing an apparatus suitable for practicing some embodiments of the disclosure.

FIG. 12 is a block diagram showing an apparatus suitable for practicing some embodiments of the disclosure. For example, any one of the AAA server and the session management function entity described above may be implemented as or through the apparatus 1200.

The apparatus 1200 comprises at least one processor 1201, such as a digital processor (DP), and at least one memory (MEM) 1202 coupled to the processor 1201. The apparatus 1200 may further comprise a transmitter TX and receiver RX 1203 coupled to the processor 1201. The MEM 1202 stores a program (PROG) 1204. The PROG 1204 may include instructions that, when executed on the associated processor 1201, enable the apparatus 1200 to operate in accordance with the embodiments of the present disclosure. A combination of the at least one processor 1201 and the at least one MEM 1202 may form processing means 1205 adapted to implement various embodiments of the present disclosure.

Various embodiments of the present disclosure may be implemented by computer program executable by one or more of the processor 1201, software, firmware, hardware or in a combination thereof.

The MEM 1202 may be of any type suitable to the local technical environment and may be implemented using any suitable data storage technology, such as semiconductor based memory devices, magnetic memory devices and systems, optical memory devices and systems, fixed memories and removable memories, as non-limiting examples.

The processor 1201 may be of any type suitable to the local technical environment, and may include one or more of general purpose computers, special purpose computers, microprocessors, digital signal processors (DSPs) and processors based on multicore processor architecture, as non-limiting examples.

In an embodiment where the apparatus is implemented as or at the AAA server, the memory 1202 contains instructions executable by the processor 1201, whereby the AAA server operates according to any step of any of the methods related to the AAA server as described above.

In an embodiment where the apparatus is implemented as or at the session management function entity, the memory 1202 contains instructions executable by the processor 1201, whereby the session management function entity operates according to any step of any of the methods related to the session management function entity as described above.

Figure 13:
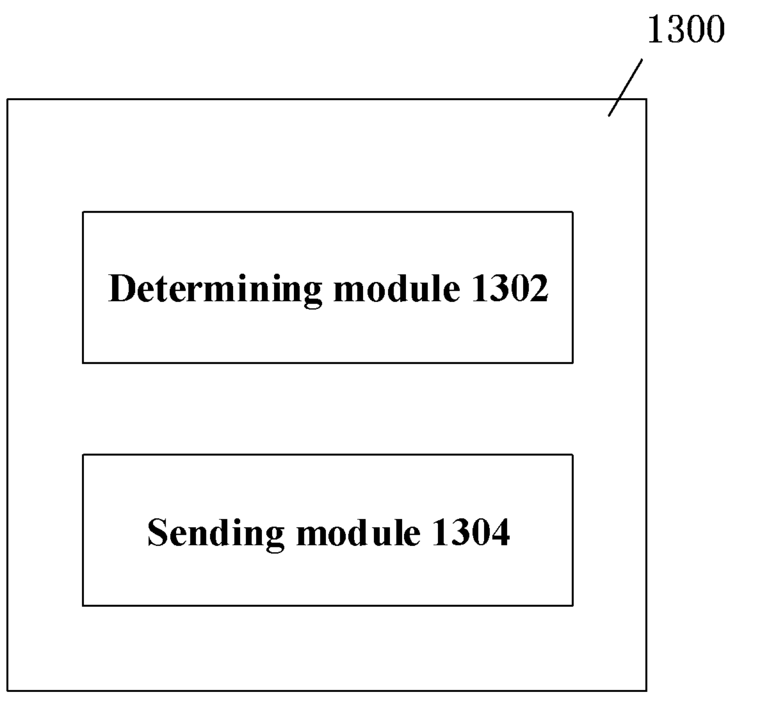
FIG. 13 is a block diagram showing a session management function entity according to an embodiment of the disclosure.

FIG. 13 is a block diagram showing a session management function entity according to an embodiment of the disclosure. As shown, the session management function entity 1300 comprises a determining module 1302 and a sending module 1304. The determining module 1302 may be configured to determine whether to initiate a secondary authentication and/or authorization of a session of a terminal device after the terminal device moves from a first network to a second network or from the second network to the first network. The sending module 1304 may be configured to, in response to a positive determination, send a first message to an authentication, authorization, and accounting, AAA, server to initiate the secondary authentication and/or authorization of the session of the terminal device.

Figure 14:
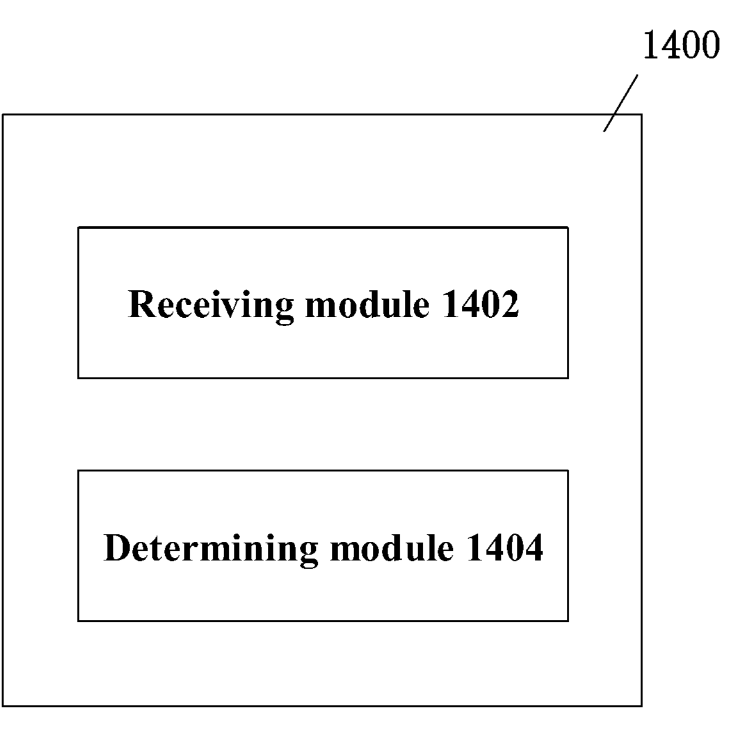
FIG. 14 is a block diagram showing an AAA server according to an embodiment of the disclosure.

FIG. 14 is a block diagram showing an AAA server according to an embodiment of the disclosure. As shown, the AAA server 1400 comprises a receiving module 1402 and a determining module 1404. The receiving module 1402 may be configured to receive a first message from a session management function entity to initiate a secondary authentication and/or authorization of a session of a terminal device. The determining module 1404 may be configured to determine whether to initiate the secondary authentication and/or authorization of the session of the terminal device based on the first message. The secondary authentication and/or authorization of the session of the terminal device is determined to be initiated after the terminal device moves from a first network to a second network or from the second network to the first network.

Figure 15:
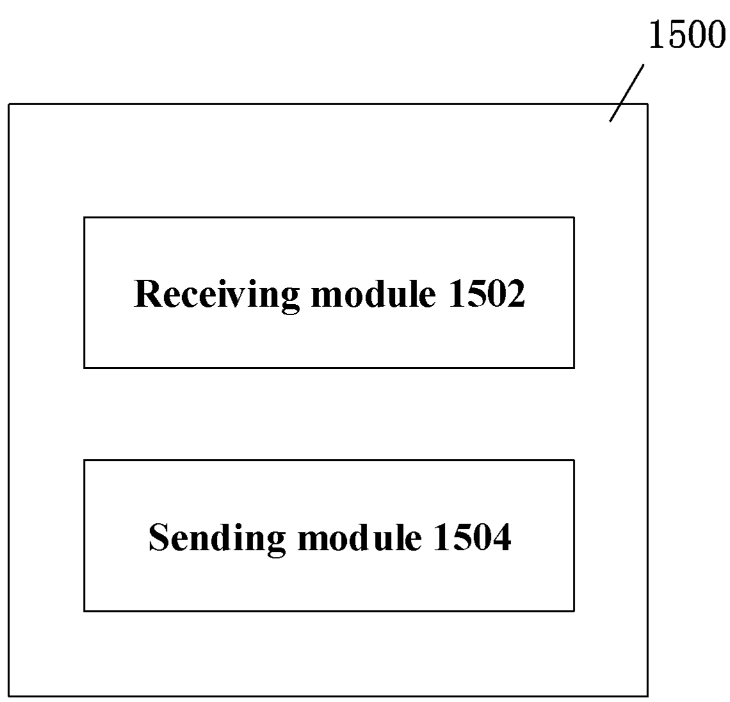
FIG. 15 is a block diagram showing a session management function entity according to another embodiment of the disclosure.

FIG. 15 is a block diagram showing a session management function entity according to another embodiment of the disclosure. As shown, the session management function entity 1500 comprises a receiving module 1502 and a sending module 1504. The receiving module 1502 may be configured to receive a third message related to a secondary authentication and/or authorization of a session of a terminal device from an authentication, authorization, and accounting, AAA, server. The sending module 1504 may be configured to send a fourth message to the AAA server. The fourth message includes information for indicating that the terminal device has moved to the first network and/or an indication that the secondary authentication and/or authorization of the session of the terminal device is pending.

Figure 16:
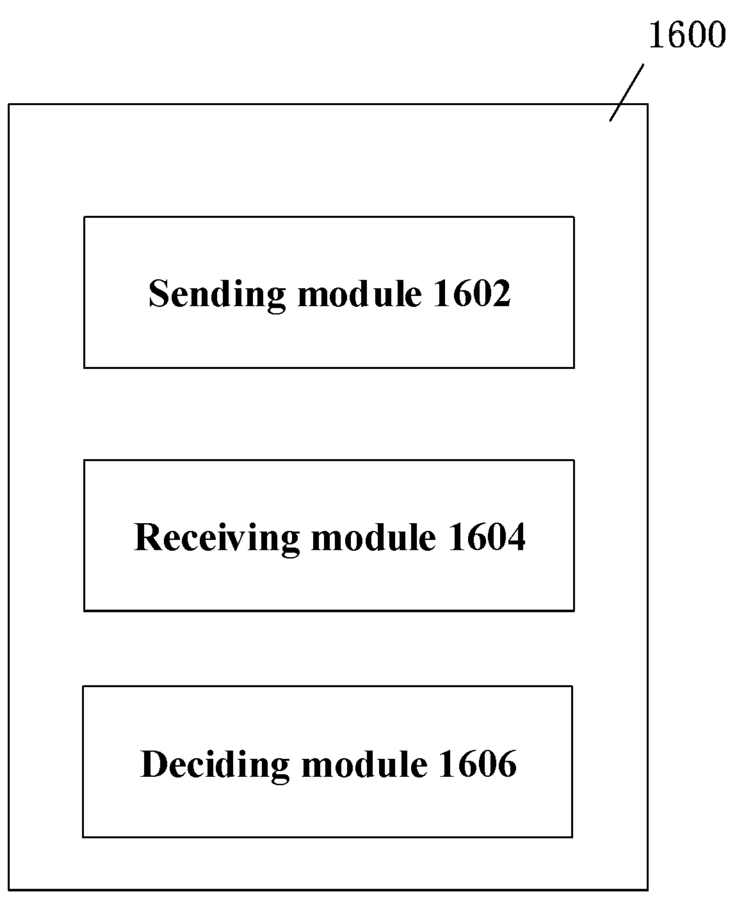
FIG. 16 is a block diagram showing an AAA server according to another embodiment of the disclosure.

FIG. 16 is a block diagram showing an AAA server according to another embodiment of the disclosure. As shown, the AAA server 1600 comprises a sending module 1602, a receiving module 1604 and a deciding module 1606. The sending module 1602 may be configured to send a third message related to a secondary authentication and/or authorization of a session of a terminal device to the session management function entity. The receiving module 1604 may be configured to receive a fourth message from the session management function entity, wherein the fourth message includes information for indicating that the terminal device has moved to the first network and/or an indication that the secondary authentication and/or authorization of the session of the terminal device is pending. The deciding module 1606 may be configured to decide to maintain the session or initiate a session release procedure for releasing the session of the terminal device based on the fourth message.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

With function units, the session management function entity or the AAA server may not need a fixed processor or memory. The introduction of virtualization technology and network computing technology may improve the usage efficiency of the network resources and the flexibility of the network.

According to an aspect of the disclosure it is provided a computer program product being tangibly stored on a computer readable storage medium and including instructions which, when executed on at least one processor, cause the at least one processor to carry out the method related to the session management function entity as described above.

According to an aspect of the disclosure it is provided a computer program product being tangibly stored on a computer readable storage medium and including instructions which, when executed on at least one processor, cause the at least one processor to carry out the method related to the AAA server as described above.

According to an aspect of the disclosure it is provided a computer-readable storage medium storing instructions which when executed by at least one processor, cause the at least one processor to perform the method related to the session management function entity as described above.

According to an aspect of the disclosure it is provided a computer-readable storage medium storing instructions which when executed by at least one processor, cause the at least one processor to perform the method related to the AAA server as described above.

Embodiments herein afford many advantages, of which a non-exhaustive list of examples follows. In some embodiments herein, at least one above problem may be solved for the terminal device which initially attaches to the first network such as EPS and moves to the second network such as 5GS during a session life. In some embodiments herein, the session management function entity such as SMF can get the second network (such as 5GS) attributes from the AAA server when the terminal device moves to the second network such as 5GS. In some embodiments herein, the AAA server can have the correct information when triggering the secondary authentication and/or authorization such as re-authentication. The embodiments herein are not limited to the features and advantages mentioned above. A person skilled in the art will recognize additional features and advantages upon reading the following detailed description.

In addition, the present disclosure may also provide a carrier containing the computer program as mentioned above, wherein the carrier is one of an electronic signal, optical signal, radio signal, or computer readable storage medium. The computer readable storage medium can be, for example, an optical compact disk or an electronic memory device like a RAM (random access memory), a ROM (read only memory), Flash memory, magnetic tape, CD-ROM, DVD, Blue-ray disc and the like.

The techniques described herein may be implemented by various means so that an apparatus implementing one or more functions of a corresponding apparatus described with an embodiment comprises not only prior art means, but also means for implementing the one or more functions of the corresponding apparatus described with the embodiment and it may comprise separate means for each separate function, or means that may be configured to perform two or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Exemplary embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

What is claimed is:

1. A method at a session management function entity, comprising:

receiving a third message for a secondary authentication or authorization of an established session of a terminal device from an authentication, authorization, and accounting, AAA, server, wherein the established session was previously authenticated or authorized in a first network; and sending a fourth message to the AAA server, wherein the fourth message indicates that the terminal device is not applicable for re-authentication in a current, second network because the terminal device has moved from the first network to the current network, wherein the move between the current network and the first network comprises a change of core network type or change of radio access technology, RAT, type.

2. The method according to claim 1, further comprising:

setting a flag used to indicate a secondary authentication or authorization of the session of the terminal device cannot be performed.

3. The method according to claim 1, wherein the third message is a Remote Authentication Dial In User Service, RADIUS, Change-of-Authorization, CoA, request or a Diameter Re-Auth-Request, RAR; and wherein the fourth message is a RADIUS CoA response or a Diameter Re-Auth-Answer, RAA.

4. The method according to claim 1, further comprising:

determining whether to initiate the secondary authentication or authorization of the session of the terminal device after the terminal device moves from the first network to a second network or from the second network to the first network; and in response to a positive determination, sending a first message to the AAA server to initiate the secondary authentication or authorization of the session of the terminal device.

5. The method according to claim 4, wherein determining whether to initiate the secondary authentication or authorization of the session of the terminal device after the terminal device moves from the first network to the second network is based on at least one of subscription data of the terminal device or a local policy of the session management function entity or an indication that the secondary authentication or authorization of the session of the terminal device is pending; or determining to initiate the secondary authentication or authorization of the session of the terminal device after the terminal device moves from the first network to the second network or from the second network to the first network.

6. The method according to claim 5, wherein the indication that the secondary authentication or authorization of the session of the terminal device is pending is a flag.

7. The method according to claim 4, further comprising:
receiving a second message including a result of authentication/authorization of the session of the terminal device from the AAA server;
when the result indicates successful, maintaining the session of the terminal device; and
when the result indicates unsuccessful, initiating a session release procedure for releasing the session of the terminal device.

8. The method according to claim 7,
wherein the first message is a Remote Authentication Dial In User Service, RADIUS, Access-Request or a Diameter-EAP-Request, DER; and
wherein the second message is a RADIUS Access-Accept or a RADIUS Access-reject or a Diameter-EAP-Answer, DEA.

9. The method according to claim 4, wherein at least one authentication method of the secondary authentication uses an Extensible Authentication Protocol, EAP; and
wherein the first message comprises a report of a change between the first network and the second network.

10. The method according to claim 1, wherein the first network is an evolved packet system, EPS, and the second network is a fifth generation system, 5GS; and
wherein the AAA server is a data network AAA, DN-AAA, server; or
wherein the session of the terminal device is a protocol data unit, PDU, session.

11. The method according to claim 10, wherein the DN-AAA server is a Remote Authentication Dial In User Service, RADIUS, Authentication server or a Diameter Authentication server.

12. A method at an authentication, authorization, and accounting, AAA, server, comprising:
sending a third message for a secondary authentication or authorization of an established session of a terminal device to the session management function entity, wherein the established session was previously authenticated or authorized in a first network;
receiving a fourth message from the session management function entity, wherein the fourth message indicates that the terminal device is not applicable for re-authentication in a current, second network because the terminal device has moved from the first network to the current network, wherein the move between the current network and the first network comprises a change of core network type or change of radio access technology, RAT, type; and
deciding to maintain the session or initiate a session release procedure for releasing the session of the terminal device based on the fourth message.

13. The method according to claim 12,
wherein the third message is a Remote Authentication Dial In User Service, RADIUS, Change-of-Authorization, CoA, request or a Diameter Re-Auth-Request, RAR; and
wherein the fourth message is a RADIUS CoA response or a Diameter Re-Auth-Answer, RAA.

14. The method according to claim 12, further comprising:
receiving a first message from the session management function entity to initiate the secondary authentication or authorization of the session of the terminal device; and
initiating the secondary authentication and/or authorization of the session based on the first message,
wherein the secondary authentication or authorization of the session of the terminal device is determined to be initiated after the terminal device moves from the first network to a second network or from the second network to the first network.

15. The method according to claim 14, wherein the secondary authentication or authorization of the session of the terminal device is determined to be initiated after the terminal device moves from the first network to the second network based on at least one of subscription data of the terminal device or a local policy of the session management function entity or an indication that the secondary authentication or authorization of the session of the terminal device is pending; or the secondary authentication or authorization of the session of the terminal device is determined to be initiated after the terminal device moves from the first network to the second network or from the second network to the first network.

16. The method according to claim 14, further comprising:
sending a second message including a result of authentication/authorization of the session of the terminal device to the session management function entity.

17. The method according to claim 16,
wherein the first message is a Remote Authentication Dial In User Service, RADIUS, Access-Request or a Diameter-EAP-Request, DER; and
wherein the second message is a RADIUS Access-Accept or a RADIUS Access-reject or a Diameter-EAP-Answer, DEA.

18. The method according to claim 12, wherein at least one authentication method of the secondary authentication uses an Extensible Authentication Protocol, EAP; and
wherein the first network is an evolved packet system, EPS, and the second network is a fifth generation system, 5GS; or
wherein the first message comprises a report of a change between the first network and the second network.

19. A session management function entity, comprising:
a processor; and
a memory coupled to the processor, said memory containing instructions executable by said processor, whereby said session management function entity is operative to:
receive a third message for a secondary authentication or authorization of an established session of a terminal device from an authentication, authorization, and accounting, AAA, server, wherein the established session was previously authenticated or authorized in a first network; and
send a fourth message to the AAA server, wherein the fourth message indicates that the terminal device is not applicable for re-authentication in a current, second network because the terminal device has moved from the first network to the current network, wherein the move between the current network and the first network comprises a change of core network type or change of radio access technology, RAT, type.

20. An authentication, authorization, and accounting, AAA, server, comprising:
a processor; and
a memory coupled to the processor, said memory containing instructions executable by said processor, whereby said AAA server is operative to:

send a third message for a secondary authentication or authorization of an established session of a terminal device to the session management function entity, wherein the established session was previously authenticated or authorized in a first network;

receive a fourth message from the session management function entity, wherein the fourth message indicates that the terminal device is not applicable for re-authentication in a current, second network because the terminal device has moved from the first network to the current network, wherein the move between the current network and the first network comprises a change of core network type or change of radio access technology, RAT, type; and decide to maintain the session or initiate a session release procedure for releasing the session of the terminal device based on the fourth message.

* * * * *